(12) United States Patent
Wang et al.

(10) Patent No.: US 11,061,388 B2
(45) Date of Patent: Jul. 13, 2021

(54) LEARNING-BASED SEE-THROUGH SENSING SUITABLE FOR FACTORY AUTOMATION

(71) Applicant: Mitsubishi Electric Research Laboratories, Inc., Cambridge, MA (US)

(72) Inventors: Pu Wang, Cambridge, MA (US); Toshiaki Koike-Akino, Belmont, MA (US); Philip Orlik, Cambridge, MA (US); Arindam Bose, Chicago, IL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 76 days.

(21) Appl. No.: 16/552,116

(22) Filed: Aug. 27, 2019

(65) Prior Publication Data
US 2021/0064013 A1    Mar. 4, 2021

(51) Int. Cl.
*G06K 9/00* (2006.01)
*G05B 19/418* (2006.01)
(Continued)

(52) U.S. Cl.
CPC ... *G05B 19/41875* (2013.01); *G01N 21/3563* (2013.01); *G01N 21/3581* (2013.01); *G05B 13/027* (2013.01); *G06T 7/0004* (2013.01); *G06T 11/006* (2013.01); *G06T 11/008* (2013.01); *G05B 2219/32335* (2013.01);
(Continued)

(58) Field of Classification Search
None
See application file for complete search history.

(56) References Cited

U.S. PATENT DOCUMENTS 10,217,252 B1 *   2/2019  Wang .................... G06T 3/4076
2010/0007872 A1 * 1/2010  Isozaki ................. G01N 21/55
                                                      356/51

(Continued)

OTHER PUBLICATIONS

Wang, Ruoyu, et al. "Through-Wall Object Recognition and Pose Estimation." ISARC. Proceedings of the International Symposium on Automation and Robotics in Construction. vol. 36. IAARC Publications, 2019. (Year: 2019).*

(Continued)

*Primary Examiner* — Hadi Akhavannik
(74) *Attorney, Agent, or Firm* — Gennadiy Vinokur; Hironori Tsukamoto

(57) ABSTRACT

A scanner for image reconstruction of a structure of a target object uses a neural network trained to classify each segment of a sequence of segments of a modified wave into one or multiple classes. The sequence of segments corresponds to the sequence of layers of the target object, such that a segment of modified wave corresponds to a layer having the same index in the sequence of layers as an index of the segment in the sequence of segments. The scanner executes the neural network for each wave modified by penetration through the layers of the target object to produce the classes of segments of the modified waves. Next, the scanner selects the classes of segments of different modified waves corresponding to the same layer to produce an image of the layer of the target object with pixel values being functions of labels of the selected classes.

20 Claims, 20 Drawing Sheets

(51) Int. Cl.
*G01N 21/3563* (2014.01)
*G01N 21/3581* (2014.01)
*G05B 13/02* (2006.01)
*G06T 7/00* (2017.01)
*G06T 11/00* (2006.01)

(52) U.S. Cl.
CPC ............... *G05B 2219/45031* (2013.01); *G06T 2207/20081* (2013.01); *G06T 2207/20084* (2013.01); *G06T 2207/30148* (2013.01); *G06T 2207/30156* (2013.01)

(56) References Cited

U.S. PATENT DOCUMENTS

| | | | |
|---|---|---|---|
| 2013/0176309 A1* | 7/2013 | Sarkis | G01S 13/89 345/422 |
| 2018/0374569 A1* | 12/2018 | Niculescu-Mizil | G06T 7/001 |
| 2019/0147589 A1* | 5/2019 | Zhou | G06T 5/50 382/131 |

OTHER PUBLICATIONS

Wang, Pu, et al. "Multi-layer Terahertz imaging of non-overlapping contents." 2018 IEEE 10th Sensor Array and Multichannel Signal Processing Workshop (SAM). IEEE, 2018. (Year: 2018).*

* cited by examiner

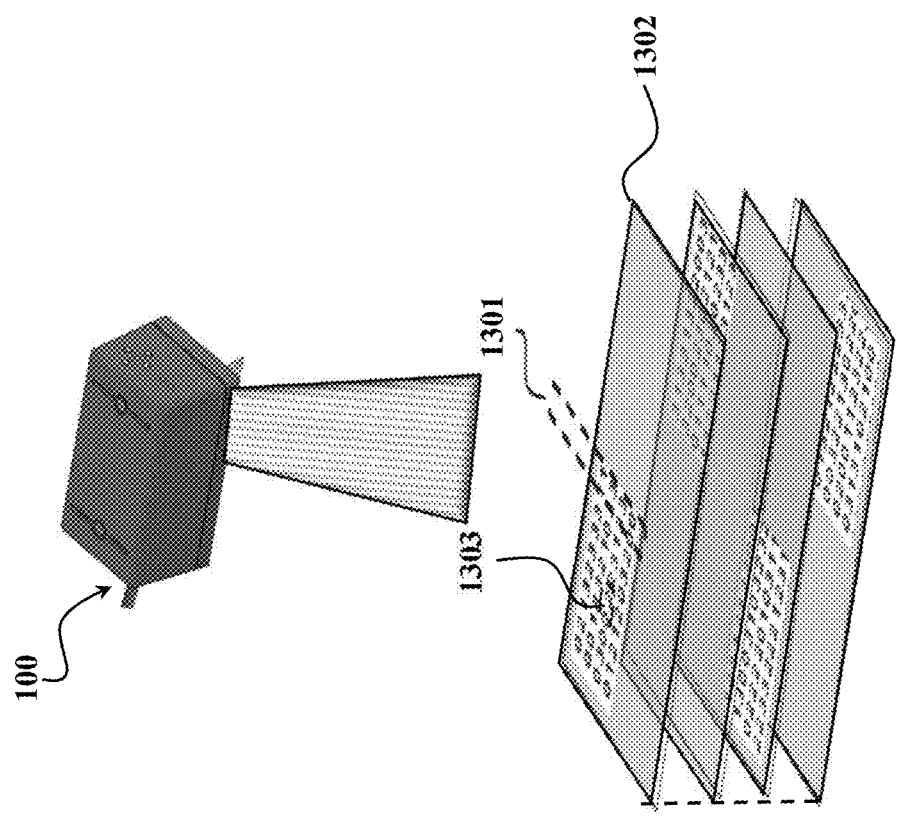

LEARNING-BASED SEE-THROUGH SENSING SUITABLE FOR FACTORY AUTOMATION

TECHNICAL FIELD

This invention relates to see-through sensing, and more specifically to system and method for image reconstruction of structure of a target object.

BACKGROUND

See-through sensing is important for many applications such as microwave imaging, biomicroscopy, medical imaging, through-the-wall imaging (TWI), infrastructure monitoring, and seismic imaging. In particular, the see-through sensing enables the visualization of the internal structure of the material and characterization of its physical properties. For example, in microwave imaging, the see-through sensing provides the structure of objects. In biomicroscopy, the see-through sensing allows to visualize the internal cell structure in three-dimensions. In TWI, the see-through sensing allows to compensate for the delay of the signal propagating through the wall.

For example, over the past two decades, there have been increased interests in terahertz (THz) sensing, in either a reflection or a transmission mode, due to the broad applications in gas sensing, moisture analysis, non-destructive evaluation, biomedical diagnosis, package inspection, and security screening. The THz sensing systems are able to inspect not only the top surface of the sample but also its internal structure, either a defect underneath the top layer or a multi-layer structure, due to its capability of penetrating a wide range of non-conducting materials.

However, the see-through sensing, such as THz sensing, suffers from complexity in image reconstruction of three-dimensional objects. In addition, to the complexity of computation, undesirable artifacts can diminish the quality of reconstructed images. To that end, various techniques, such as a hierarchical image recovery described in U.S. Pat. No. 10,217,252, are used to increase the quality of reconstructed images. However, there is still a need for a system and a method for image reconstruction of a structure of a target object.

SUMMARY

It is an object of some embodiments to provide a system and a method for image reconstruction of a structure of a target object. Additionally, or alternatively, it is another object of some embodiments to provide such an image reconstruction system and method that are suitable for factory automation.

Some embodiments are based on recognition that in a number of situations, the structure of the target object is sparse, and the sparsity can be used in the image reconstruction. However, the image reconstruction of sparse but three-dimensional structures is still a computationally challenging problem. Some embodiments are based on realization that this problem can be addressed by treating the structure of the target object as a multi-layer structure and reconstructing the images of each layer of the target object individually and/or jointly. Such a multi-layer representation of the structure allows to consider not only the sparsity of the entire structure of the target object, but also the sparsity of each individual layer. In addition, such a multi-layer representation allows partitioning and, thus, simplifying the computation of the image reconstruction.

It should be noted that, in a number of situations, the structure of the target object is indeed layered. For example, a target object can be a man-made object with a layered structure, such as a stack of papers, where each sheet of paper is a layer in that multi-layer structure, a semiconductor device formed by layers of different materials, and infrastructure extended underground at different depths. In other situations, however, a target object can be a natural object with a layered structure, such as human tissue having multiple layers. In yet some other situations, the target objects do not have a clearly observed layered structure, but still can be treated as a combination of layers.

Some embodiments are based on recognition that the images of the layers of the target object can be reconstructed individually and/or jointly to improve the quality and/or performance of image reconstruction of 3D objects. However, after a number of experiments, simulations, and testing, some embodiments identify additional problems of layered reconstruction. Indeed, why computational performance has been improved, the image quality of reconstructed images of the layers suffered. This quality degradation is more noticeable on the images of the deeper layers, leading to a recognition that despite the advantages of treating a target object as a layered-structure, such a treatment creates an additional problem in the multi-level image reconstruction. Specifically, the multi-level image reconstruction suffers from shadow effect due to the non-uniform penetrating of the wave from front layer to deeper layers. This problem can be conceptualized as a structure of one layer casts a shadow on subsequent layers and that shadow can be considered as the structure of the subsequent layers. In such a manner, the shadow effect contributes to the artifacts in the image reconstruction of the deep layers.

Some embodiments are based on realization that the shadow effect prevents an increase in sparsity of the layers of the target object in the direction of propagation of the wave penetrating the layers of the object. Indeed, if each subsequent layer has a shadow effect from a previous layer, the subsequent layer is at least as sparse as the previous layer, but usually is less sparse. In such a manner, the shadow effect is disadvantageous for image reconstruction in "horizontal" direction of layers of layers, which is perpendicular to the direction of waves' propagation and parallel to the plane of the layers.

However, some embodiments are based on realization that the shadow effect considered as a disadvantage in image reconstruction using signal processing can be turned into an advantage for classification based image reconstruction, when such a classification is performed in "vertical" direction perpendicular to the planes of the layers. Specifically, due to complication caused by the shadow effect, the wave penetrated the layered structure is uniquely modified by the structure of the materials. Furthermore, such a unique modification is stable.

As use herein, uniquely modified means that if a target object has a first structure on a first path of propagation of a first wave penetrating the target object and a second structure on a second path of propagation of a second wave penetrating the target object and the first structure is different from the second structure then the first wave modified by penetration would be different from the second wave modified by penetration even if before the modification the first and the second waves are identical.

As used herein, the unique and stable modification means that if a target object has a first structure on a first path of propagation of a first wave penetrating the target object and a second structure on a second path of propagation of a second wave penetrating the target object and the first structure is the same as the second structure then the first wave modified by penetration would be the same as the second wave modified by penetration when before the modification the first and the second waves are identical. However, if the first structure is different from the second structure then the first wave modified by penetration would be different from the second wave modified by penetration.

In such a manner, a wave modified by penetration from the target object leaves a unique and stable signature indicative of the structure of the object on the path of penetration. Hence, instead of attempting to recognize the structure during various model-based signal processing, some embodiments use a neural network trained to classify the modified wave. In addition, in various embodiments, the structure of the object is considered layered along the path of propagation and different layers can have different structures. To that end, in some embodiments, the neural network is trained to classify each segment of a sequence of segments of a modified wave into one or multiple classes. The sequence of segments corresponds to the sequence of layers of the target object, such that a segment of modified wave corresponds to a layer having the same index in the sequence of layers as an index of the segment in the sequence of segments. Hence, by classification of the modified wave can concurrently estimate a class, and thus the structure, of each layer of the target object along the penetration path of the wave.

Some embodiments are based on recognition that these classification based principles can be extended to reconstruction of an image of each layer of the target object. To that end, some embodiments emit a set of waves in parallel directions of propagation to penetrate a sequence of layers of the target object and measure intensities of the set of waves modified by penetration through the layers of the target object. Due to parallel penetration, the classes of segments of different modified waves corresponding to the same layer can be used to produce an image of the layer of the target object with pixel values being functions of labels of the selected classes. For example, in some implementations, each modified wave is associated with a location of a pixel in the image of each layer, such that a segment of a layer is associated with the location of the pixel associated with its modified wave, and a value of the pixel at the location in the image of the layer is a function of the label of the class of the segment associated with the location of the pixel in the image of the layer. Hence, index of the segment and location of the wave of the segment specify the layer and the location within the layer allowing to reconstruct two-dimensional (2D) image of the layer and 3D image of the volume of the target object.

Accordingly, one embodiment discloses a scanner for image reconstruction of a structure of a target object. The scanner includes an emitter configured to emit a set of waves in parallel directions of propagation to penetrate a sequence of layers of the target object forming the structure of the target object; a receiver configured to measure intensities of the set of waves modified by penetration through the layers of the target object; a memory configured to store a neural network trained to classify each segment of a sequence of segments of a modified wave into one or multiple classes, wherein the sequence of segments corresponds to the sequence of layers of the target object, such that a segment of modified wave corresponds to a layer having the same index in the sequence of layers as an index of the segment in the sequence of segments; a hardware processor configured to (1) execute the neural network for each modified wave to produce the classes of segments of the modified waves, and (2) select the classes of segments of different modified waves corresponding to the same layer to produce an image of the layer of the target object with pixel values being functions of labels of the selected classes; and an output interface to render one or multiple of the images of one or multiple layers of the target object.

In different embodiments, the modified waves are classified individually or collectively. The modified wave is classified individually when classes of the modified wave are estimating only from processing that modified wave. The modified wave is classified collectively when classes of the modified wave are estimating from processing not only the modified wave but also other neighboring modified waves. The individual classification simplifies the training and the processing. The collective classification can improve the accuracy of labeling.

In one embodiment with individual classification, each modified wave is uniquely associated with the location of the pixel in the image of each layer, and the value of the pixel is the label of the class of the segment associated with the location of the pixel. This embodiment is computationally efficient, and especially advantageous when a dimension of emitted wave corresponds to dimensions of the pixel. However, when dimensions of the wave is greater than the dimensions of the pixels, and/or the emitted waves partially overlap each other, then the neighboring waves can carry some information about neighboring pixels, and considering only individual waves for classification can may lose that information.

To that end, some embodiment addresses this issue using pre-training or combinatory section techniques among other. For example, in one embodiment, multiple modified waves are associated with the location of the pixel in the image of each layer, and wherein the value of the pixel is a combination of labels of the classes of the segments associated with the location of the pixel. In this embodiment, the combinatory section techniques allows to use weighted combination of multiple classes to consider information from neighboring waves or pixels.

Additionally, or alternatively, some embodiments use a neural network trained to classify the segments of the modified wave associated with the location of the pixel by processing the classified modified wave in combination of a neighboring modified wave associated with a pixel neighboring the pixel of the classified modified wave. In this embodiments, the dimensions of the classified sequence of segments stay the same, but the amount of information used for classification is increased. For example, in one embodiment, the neural network is trained to classify the segments of the modified wave associated with the location of the pixel by processing a tensor of modified waves corresponding to a cluster of pixels centered on the location of the pixel of the classified modified wave. This embodiment ensures accuracy and uniqueness of classification.

Different embodiments use different types of emitters selected based on an expected structure of the target object and desired type of image reconstruction. Examples of emitters include optical, ultrasound, and x-ray emitters. Some embodiments use terahertz (THz) emitters emitting within a terahertz frequency range, e.g., from 0.3 to 3 terahertz with corresponding wavelengths from 1 mm to 0.1 mm (or 100 µm). Because THz scanners are sensitive to non-uniform penetrating illumination from front layers to deep layers, the joint-layer hierarchical image recovery benefits these kinds of emitters.

Additionally, or alternatively, some embodiments use scanners that operate in a compressed scanning mode. This type of scanner can further decrease the dependency on non-uniform penetration due to principles of compressed reconstruction. For example, in one embodiment, the emitter includes a collimator to collimate the wave to a broad beam, and a spatial encoder to spatially encode the broad beam with a random mask. In addition, the receiver includes a focusing lens to focus the reflected wave, and a single-pixel photoconductive detector receiving the focused wave from the focusing lens to provide one measurement of the focused wave at a time allowing to recover the image of the multi-layer structure using a sparse reconstruction.

Some embodiments employ a scanner according to various embodiments as part of automation system. Automation is the technology by which a process or procedure is performed with minimal human assistance. Automation or automatic control is the use of various control systems for operating equipment such as machinery, processes in factories, boilers and heat treating ovens, switching on telephone networks, steering and stabilization of ships, aircraft and other applications and vehicles with minimal or reduced human intervention. Some embodiments are based on recognition that classification based image reconstruction of different layers of a manufactured object is advantageous for factory automation, including the real time diagnostic process. For example, the layered structure and dimensions of modern manufacturing allow taking an advantage from THz-TDS imaging of some embodiments during manufacturing process.

BRIEF DESCRIPTION OF THE DRAWINGS

FIG. 13 shows a schematic of a multi-layer structure with different patterns of the layers, according to one embodiment.

DETAILED DESCRIPTION

Figure 1:
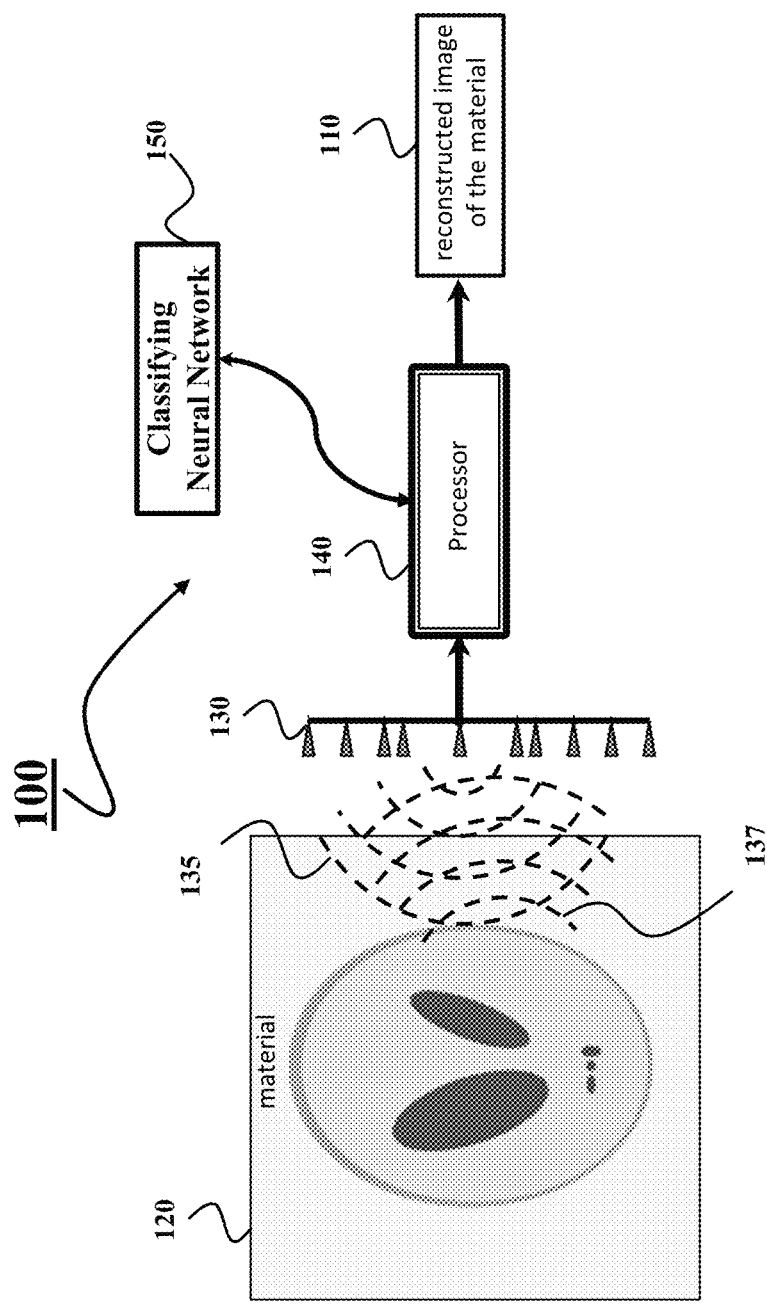
FIG. 1 shows a block diagram of a scanner suitable to act as a permittivity sensor for determining an image of a distribution of permittivity of a material according to some embodiments.

FIG. 1 shows a block diagram of a scanner 100 suitable to act as a permittivity sensor for determining an image 110 of a distribution of permittivity of a material 120 according to some embodiments. The permittivity sensor includes at least one transceiver 130 to propagate a wave 135 through the material of a target object 120 and to receive a set of echoes 137 resulted from scattering the pulse by different portions of the material.

For example, the transceiver can include at least one transmitter that transmits the pulse through the material, such that the pulse scattered by the material produces the set of echoes 137. The pulse can be any type of electromagnetic or optical waves, such as one or combination of a microwave pulse, a radar pulse, a laser pulse, an ultrasound pulse, an acoustic pulse. The transceiver can also include at least one receiver arranged at a predetermined location with respect to the transmitter for receiving the set of echoes 137. For example, in one embodiment, a receiver and a transmitter form a transceiver 130. In a different embodiment, a receiver and a transmitter are located on the same side of the object 120 such that the echoes 137 include propagation and reflections of the emitted waves. In a different embodiment, a receiver and a transmitter are located on different sides of the object 120, such that the emitted waves are modified by the propagation of through the material of the object once. According to different embodiments, the permittivity sensor can produce a two- or three-dimensional image of the material, where each location in the image provides the value of the dielectric permittivity for a portion of material corresponding to that location.

The permittivity sensor also includes a processor 140 operatively connected with the transceiver 130 to determine the image 110 based on the set of echoes 137. In order to account for multiple scattering, the processor uses a neural network 150 to produce the image 110 of the distribution of the permittivity of the material. The image reconstruction of three-dimensional structures is a computationally challenging problem due to complexity of for multiple scattering of the propagating wave by the structure of material. To address this complexity, instead of attempting to use neural network to recreate the physics of the scattering, the neural network 150 is a classification network trained to classified wave modified by propagation in one or multiple classes. Hence, the neural network 150 is referred herein as a classification neural network.

Specifically, some embodiments are based on realization that complexity of image recreation of complex physical processes of wave scattering can be addressed by treating the structure of the target object as a multi-layer structure and reconstructing the images of each layer of the target object individually and/or jointly. Such a multi-layer representation of the structure allows considering not only the sparsity of the entire structure of the target object, but also the sparsity of each individual layer. In addition, such a multi-layer representation allows partitioning and, thus, simplifying the computation of the image reconstruction.

It should be noted that, in a number of situations, the structure of the target object is indeed layered. For example, a target object can be a man-made object with a layered structure, such as a stack of papers, where each sheet of paper is a layer in that multi-layer structure, a semiconductor device formed by layers of different materials, and infrastructure extended underground at different depths. In other situations, however, a target object can be a natural object with a layered structure, such as human tissue having multiple layers. In yet some other situations, the target objects do not have a clearly observed layered structure, but still can be treated as a combination of layers.

Figure 2:
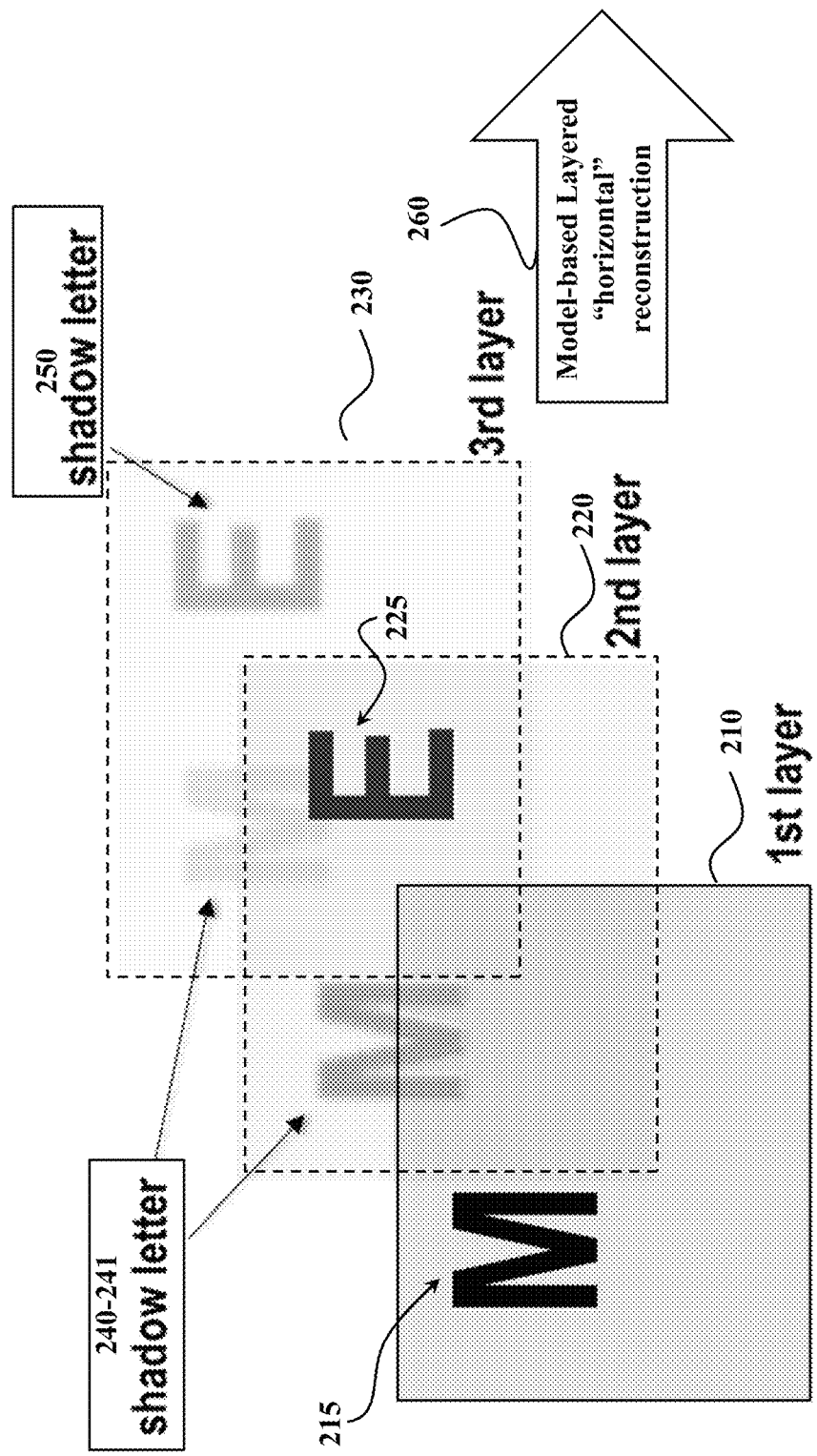
FIG. 2 shows a schematic of an exemplar structure of a target object according to one embodiment.

FIG. 2 shows a schematic of an exemplar structure of a target object according to one embodiment. In this example, the target structure man-made object with a layered structure, i.e., a stack of three sheet of papers. This example illustrate a problem of image reconstruction created by treating the target object as a layered structure.

Specifically, some embodiments are based on recognition that the images of the layers of the target object can be reconstructed individually and/or jointly. Some embodiments reconstruct the images using sparse reconstruction by fitting reconstructed images into the measurements of the intensities of the reflected wave. Such a sparse reconstruction is performed with regularization to prevent overfitting. Different embodiments perform the individual and/or joint reconstruction of the layers by selecting an appropriate regularization. For example, for individual reconstruction, the regularizations are individual for each layer. In contrast, for a joint reconstruction, the regularization is a joint regularization determined as a weighted combination of individual regularizations of the layers.

However, after a number of experiments, simulations, and testing, some embodiments identify additional problems of layered reconstruction. Indeed, why computational performance has been improved, the image quality of reconstructed images of the layers suffered. This quality degradation more noticeable on the images of the deeper layers. This problem is partially addressed by the joint reconstruction, but still, in a number of experiments, the images of the deeper layers reconstructed using individual and/or joint reconstruction include artifacts.

Some embodiments are based on recognition that despite the advantages of treating a target object as a layered-structure, such a treatment create an additional problem in the multi-level image reconstruction. Specifically, the multi-level image reconstruction suffers from shadow effect due to the non-uniform penetrating of the wave from front layer to deeper layers. This problem can be conceptualized as a structure of one layer casts a shadow on subsequent layers and that shadow can be considered as the structure of the subsequent layers. In such a manner, the shadow effect contributes to the artifacts in the image reconstruction of the deep layers.

FIG. 2 shows a schematic of the shadow effect of patterns from front layers to deep layers. The pattern 215 of a letter 'M' appears at the first layer 210 of the structure of a target object and the pattern 225 of a letter 'E' appears at the second layer 220 of the structure 130. Due to the non-uniform penetration, a shadow letter of 'M' appears 240 on the second layer 220 and also appears 241 on a third layer 230. Likewise, a shadow letter of 'E' appears 250 on the third layer 230. It is an object of some embodiments to recover the patterns/letters 'M' and 'E' even in the presence of shadow effect.

Some embodiments are based on realization that the shadow effect prevents an increase in sparsity of the layers of the target object in the direction of propagation of the wave penetrating the layers of the object. During the layered reconstruction 260, each subsequent layer has a shadow effect from a previous layer, the subsequent layer is at least as sparse as the previous layer, but usually is less sparse. To that end, some embodiments are based on realization that if such a constraint is enforced on joint images reconstruction of the layers, such a constraint forces the reconstruction to consider shadow effect to reduce the unwanted artifacts. To that and the model-based images reconstruction 260 in "horizontal" direction in the plane of each layer is computationally challenging.

Figure 3:
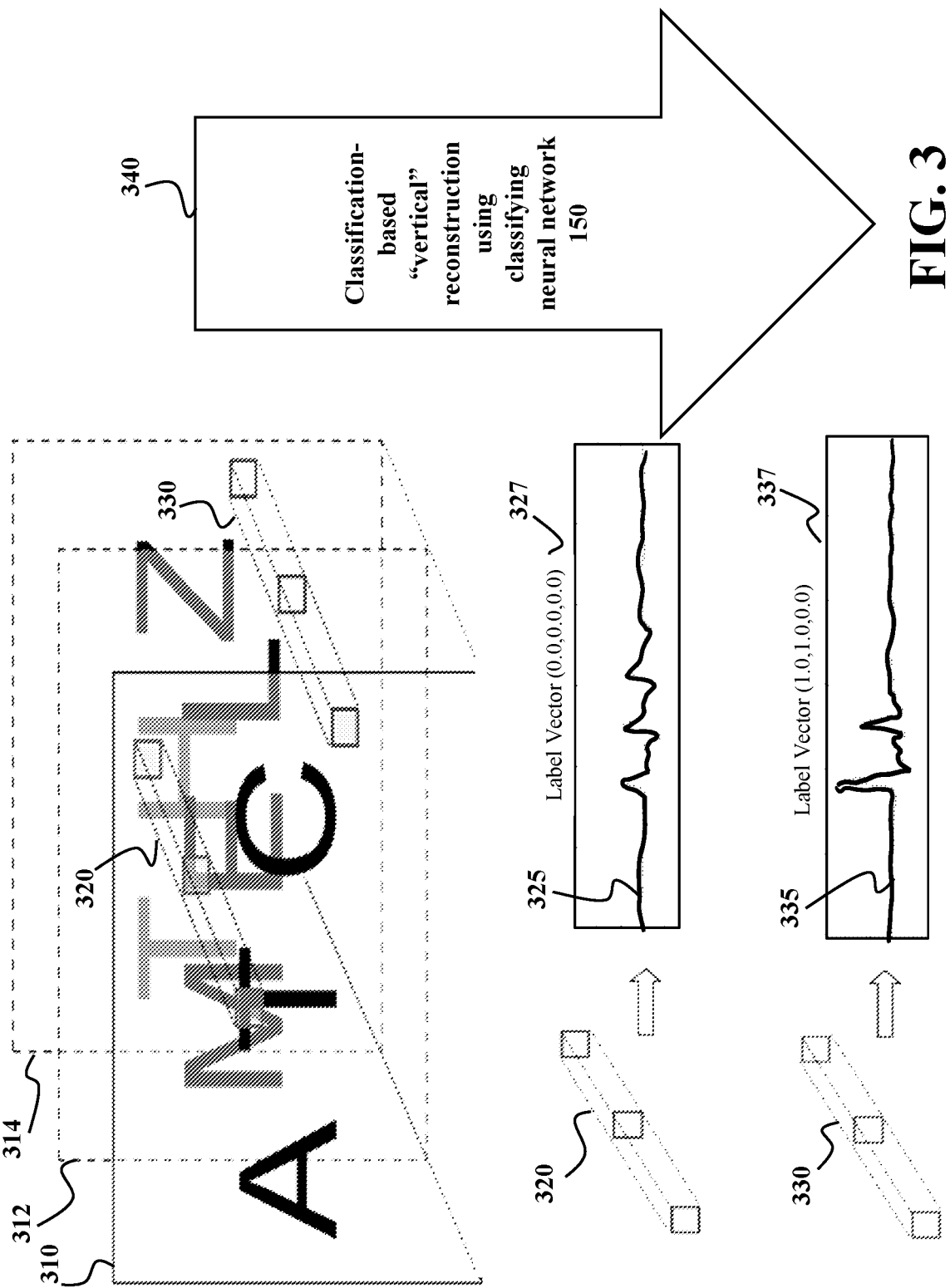
FIG. 3 shows a schematic of principles of classification used by some embodiments of see-through image reconstruction.

FIG. 3 shows a schematic of principles of classification used by some embodiments of see-through image reconstruction. The embodiments are based on realization that the shadow effect considered as a disadvantage in image reconstruction using signal processing can be turned into an advantage for classification based image reconstruction. Specifically, due to complication caused by the shadow effect, the wave penetrated the layered structure is uniquely modified by the structure of the materials. On the other hand, such a unique modification is stable.

As use herein, uniquely modified means that if a target object has a first structure on a first path of propagation of a first wave penetrating the target object and a second structure on a second path of propagation of a second wave penetrating the target object and the first structure is different from the second structure then the first wave modified by penetration would be different from the second wave modified by penetration even if before the modification the first and the second waves are identical.

As used herein, the stable modification means that if a target object has a first structure on a first path of propagation of a first wave penetrating the target object and a second structure on a second path of propagation of a second wave penetrating the target object and the first structure is the same as the second structure then the first wave modified by penetration would be the same as the second wave modified by penetration when before the modification the first and the second waves are identical.

In such a manner, a wave modified by penetration from the target object leaves a unique and stable signature indicative of the structure of the object on the path of penetration. Hence, instead of attempting to recognize the structure during various model-based signal processing, some embodiments use a neural network trained to classify the modified signal.

In the example of FIG. 3, the target object includes three layers 310, 312, and 314. Instead of looking into "horizontal" direction as described with relation to FIG. 2, some embodiments look into "vertical" direction, i.e., along the path of wave propagation to analyze/classify 340 the waves modified by the propagation. For example, the voxels 320 and 330 extending into the direction of wave propagation includes the waves 325 and 335 modified by the scattering by material of the layers. This scattering is complicated to ensure that if the material of the voxels 320 and 320 are different from each other, then the modified waves 325 and 335 are different from each other as well. However, the scattering act in a stable manner, so if multiple waves repeatedly propagates through material of the voxel 320, then the propagated wave 325 would have similar signature suitable for classification 340.

In such a manner, the classification based neural network 340 can be trained to classified modified waves 325 and 335 into, e.g., vectors 327 and 337 of labels of the classes that can be used to reconstruct the image of material of the target object. In addition, in various embodiments, the structure of the object is considered layered along the path of propagation and different layers can have different structures. To that end, in some embodiments, the neural network is trained to classify each segment of a sequence of segments 327 and 337 of a modified wave, 325 and 335 respectively, into one or multiple classes. The sequence of segments corresponds to the sequence of layers of the target object, such that a segment of modified wave corresponds to a layer having the same index in the sequence of layers as an index of the segment in the sequence of segments. Hence, by classification of the modified wave can concurrently estimate a class, and thus the structure, of each layer of the target object along the penetration path of the wave.

Some embodiments are based on recognition that these classification based principles can be extended to reconstruction of an image of each layer of the target object. To that end, some embodiments emit a set of waves in parallel directions of propagation to penetrate a sequence of layers of the target object and measure intensities of the set of waves modified by penetration through the layers of the target object. Due to parallel penetration, the classes of segments of different modified waves corresponding to the same layer can be used to produce an image of the layer of the target object with pixel values being functions of labels of the selected classes. For example, in some implementations, each modified wave is associated with a location of a pixel in the image of each layer, such that a segment of a layer is associated with the location of the pixel associated with its modified wave, and a value of the pixel at the location in the image of the layer is a function of the label of the class of the segment associated with the location of the pixel in the image of the layer. Hence, index of the segment and location of the wave of the segment specify the layer and the location within the layer allowing to reconstruct two-dimensional (2D) image of the layer and 3D image of the volume of the target object.

Figure 4:
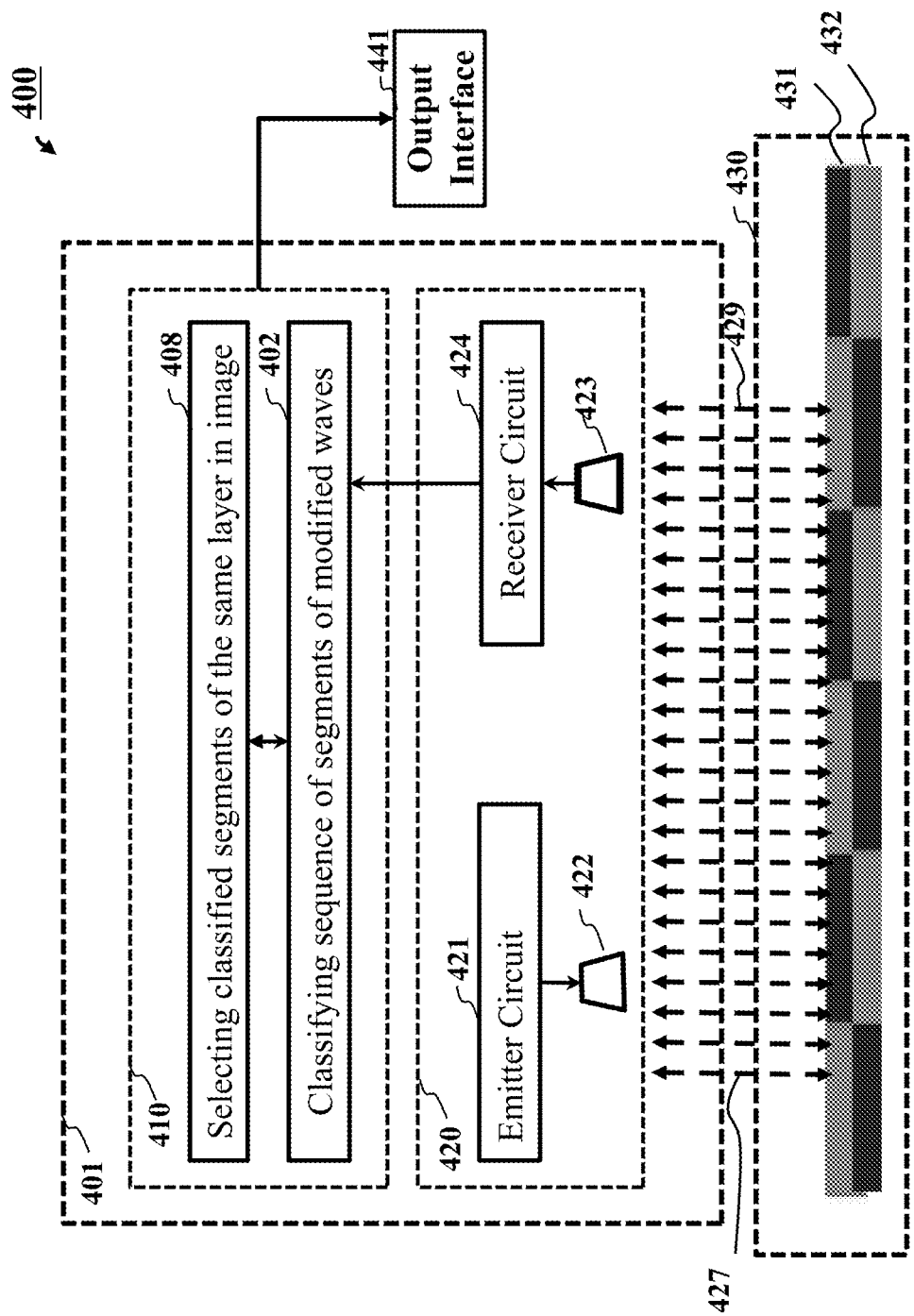
FIG. 4 shows a schematic of a scanner 400 according to some embodiments.

FIG. 4 shows a schematic of a scanner 400 according to some embodiments. The scanner include a sensing system 420 that includes an emitter 421 and a receiver 424. The emitter is configured to emit a set of waves 427 from an antenna 422 in a direction of propagation to penetrate layers 431-432 of a structure of a target object 430. The receiver 424 is configured to measure intensities of the wave modified 429 by the layers of the target object 430 and accepted through an antenna 423.

The scanner 400 includes a computer-based information system 410 including a hardware processor configured to execute 402 a neural network for each modified wave 429 to produce the classes of segments of the modified waves. The neural network is trained to classify each segment of a sequence of segments of a modified wave into one or multiple classes. The processor selects 408 the classes of segments of different modified waves corresponding to the same layer to produce an image of the layer of the target object with pixel values being functions of labels of the selected classes. The scanner 400 also includes an output interface 441 to render the reconstructed images of layers of the target object.

In some embodiments, the sequence of segments corresponds to the sequence of layers of the target object, such that a segment of modified wave corresponds to a layer having the same index in the sequence of layers as an index of the segment in the sequence of segments. Such a correspondence between indexes of labels produced by the neural network and the indexes of the layers of the target object allows to perform layered-based image reconstruction. Additionally, or alternatively, each modified wave is associated with a location of a pixel in the image of each layer, such that a segment of a layer is associated with the location of the pixel associated with its modified wave, and wherein a value of the pixel at the location in the image of the layer is a function of the label of the class of the segment associated with the location of the pixel in the image of the layer.

Figure 5:
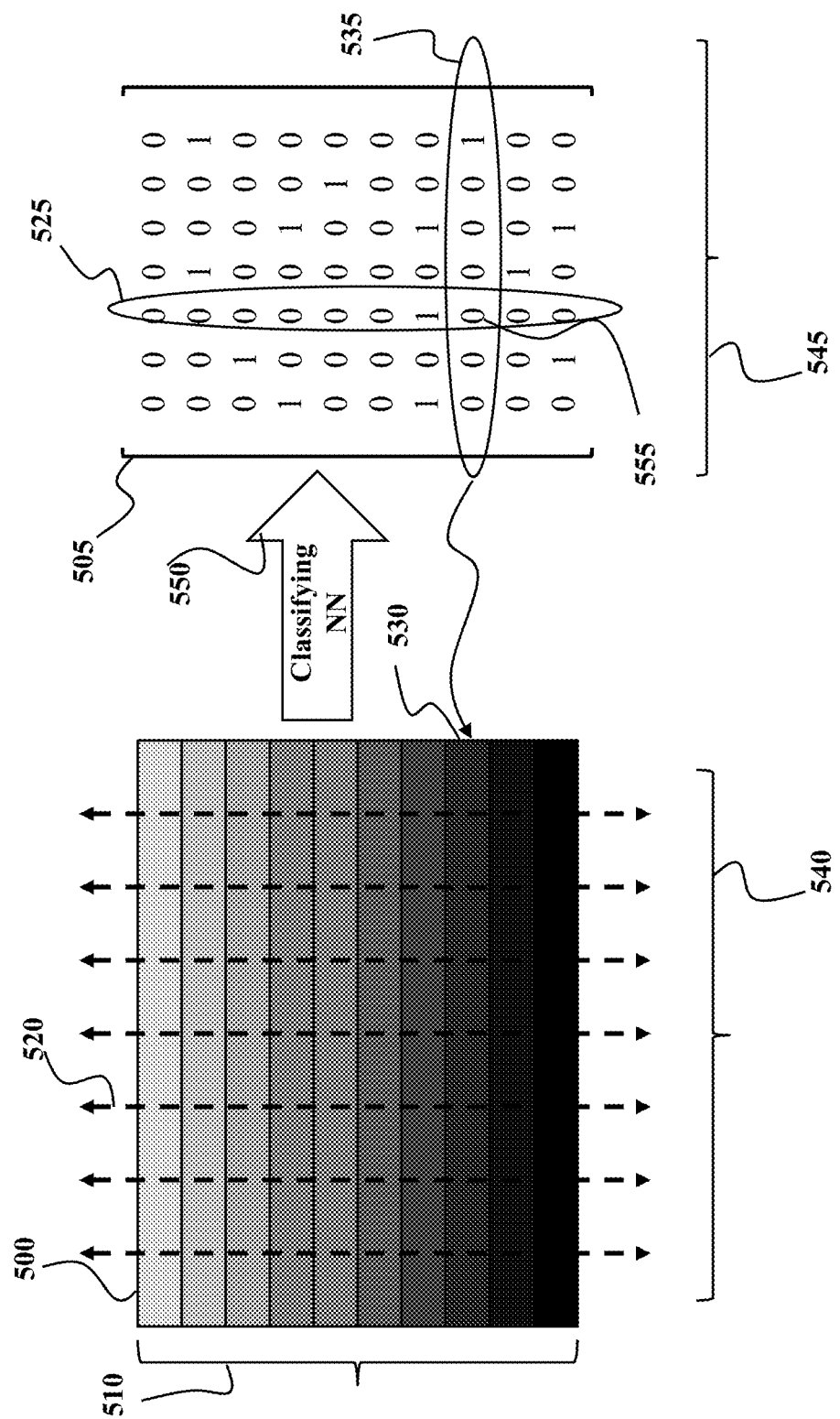
FIG. 5 shows a cross-section of layered structure of a target object along a path of propagation of the wave according to some embodiments.

FIG. 5 shows a cross-section of layered structure of a target object along a path of propagation of the wave to illustrate principles of classification 550 of the modified waves according to some embodiments. In this example, the target object 500 includes 10 layers 510. In some embodiments, the layers are the physical layers of the structure of the target object. In other embodiments, the layers can be considered as an abstraction captured during the training of the classification neural network 550 according to some embodiments. This is because the number of layers corresponds to the number of outputs of the neural network. For example, if the target object has 10 layers, the output of the neural network classifying a modified wave, such as the wave 520 penetrating the target object 500 includes 10 labels. Similarly, if the output of the classifying neural network 550 includes 10 labels, the target object 500 is considered to have 10 layers.

In such a manner, the index of the layer 530 is the index of a segment of the waves 520 and is the index of the labels 535 in the outputs of the neural network. Such an indexing allows the processor 402 to select 408 the labels 525 having the same index in the outputs of the neural network as labels 535 forming the image of the same layer 530.

Similarly, each column of the outputs of the neural network 505 corresponds to classification of a particular wave. If for example, seven waves 540 penetrate the layers of the object in a single cross section, the outputs of the classification include seven vectors 545. For example, a vector 525 corresponds to the classification results of the wave 320. In turn, the wave 320 corresponds to a specific location across all layers allowing to associate a value of classification, such a label 555 with both the layer and the location within the layer.

Some embodiments use a 2L×1 binary content vector (e.g., $[0; 0; 0; 0; 0; 0]^T$) to denote the content over L layers, where 1 means there is pencil ink while 0 denotes no pencil ink in that pixel. These embodiments treat each layer as having two sides. Additionally, or alternatively, in some embodiments the neural network is a binary classifier to estimate black or white value at a location of a pixel of the image of the layer. Additionally, or alternatively, in some embodiments the neural network is a multi-class classifier to estimate a grayscale value at a location of a pixel of the image of the layer. Additionally, or alternatively, in some embodiments the neural network is a multi-class classifier to estimate a value of permittivity of material of the target object at a location of a pixel of the image of the layer.

Figure 6:
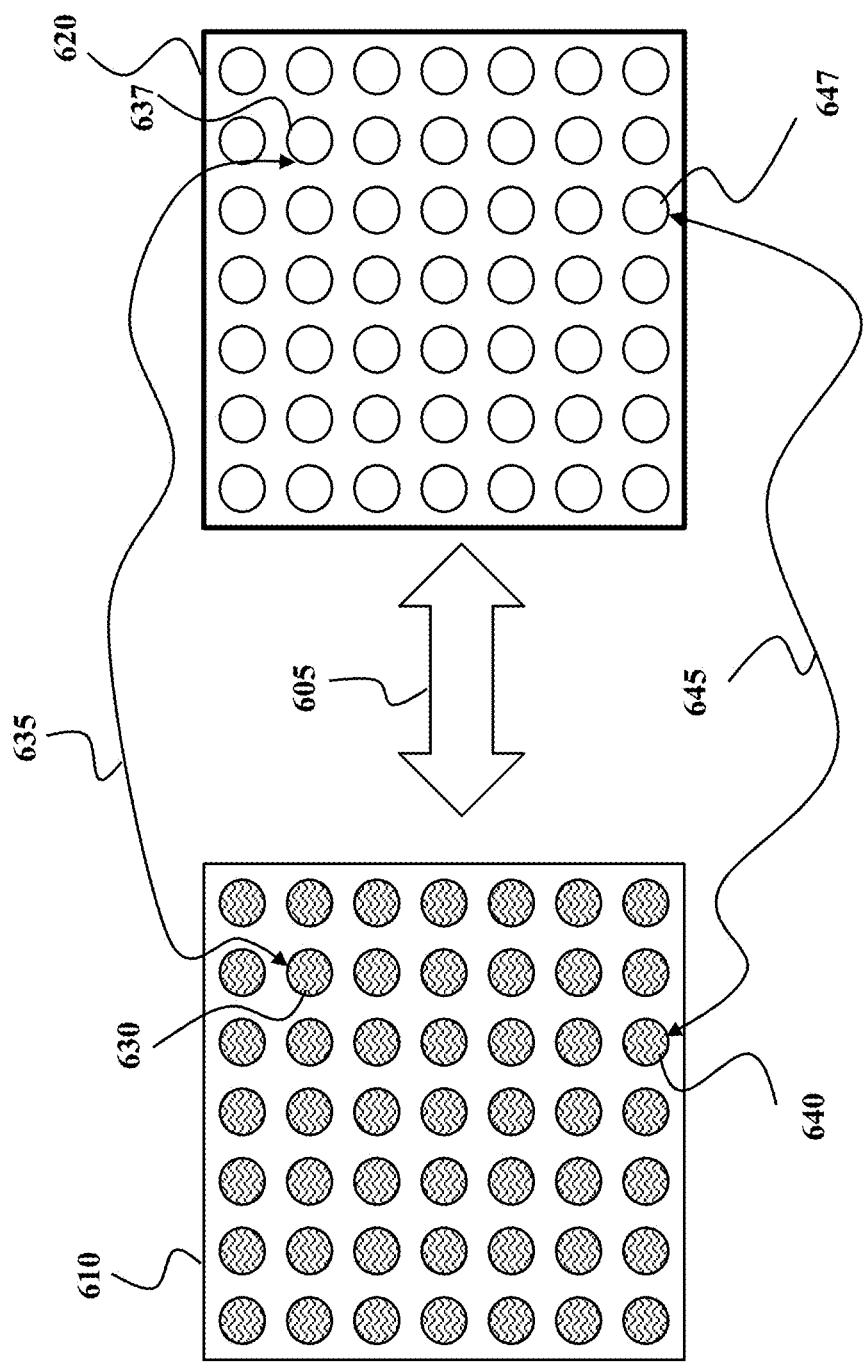
FIG. 6 shows a cross-section of layered structure of a target object perpendicular to a path of wave propagation according to some embodiments.

FIG. 6 shows a cross-section 610 of layered structure of a target object perpendicular to a path of wave propagation to illustrate principles of locations of outputs of classification in an image 620 of a layer of a target object according to some embodiments. In various embodiments, each modified wave is associated 605 with the location of the pixel in the image of each layer. For example, a wave 630 is associated 635 with location of a pixel 637 in the image 620, while a wave 640 is associated 645 with location of a pixel 647. In such a manner, the value of the pixel is the label of the class of the segment associated with the location of the pixel.

In some embodiments, each modified wave is uniquely associated with the location of the pixel in the image of each layer, and the value of the pixel is the label of the class of the segment associated with the location of the pixel. For example, the value of the pixel 637 for a layer is a label of the class of the segment of the wave 630 having an index of this layer in a sequence of segments of the wave 630. In different embodiments, multiple modified waves are associated with the location of the pixel in the image of each layer, and the value of the pixel is a combination of labels of the classes of the segments associated with the location of the pixel.

Figure 7:
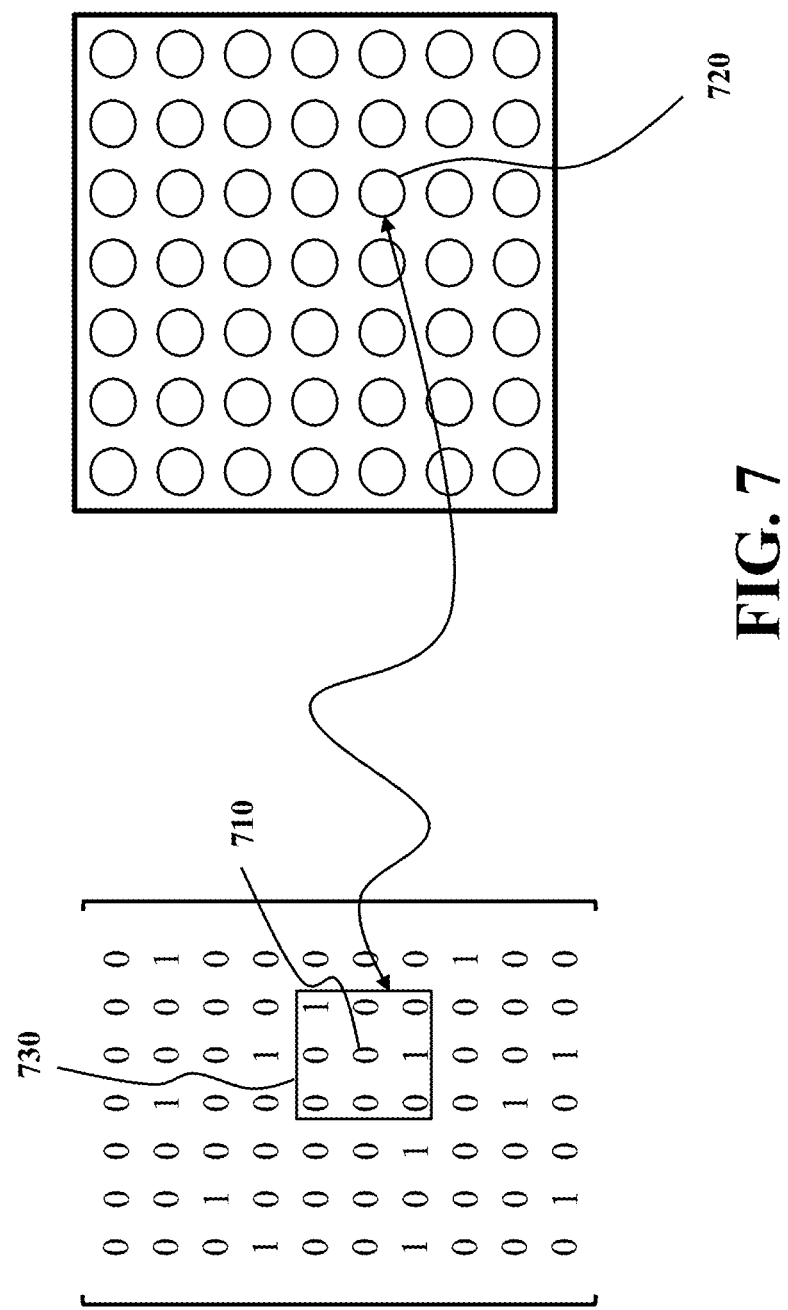
FIG. 7 shows a schematic of redundant association according to some embodiments.

FIG. 7 shows a schematic of redundant association according to some embodiments. In this example, multiple waves in the box 730 are associated with the location of the pixel 720, such that the value of the pixel is a combination of the labels of the waves in the box 730. Different waves can have different weights in the combination. For example, the centered wave 710 corresponding to the location of the pixel 720 as in embodiment of FIG. 6 can have the highest weight.

This embodiment is based on recognition that modified waves can overlap the location of multiple pixels, and consideration of multiple waves can reuse entire energy of the waves neighboring the location of the pixel. In this embodiment, such energy is collected in a post-process following the classification. Additionally, or alternatively, in some embodiments, the spread of the energy is considered during the training of the classification neural network.

Figure 8:
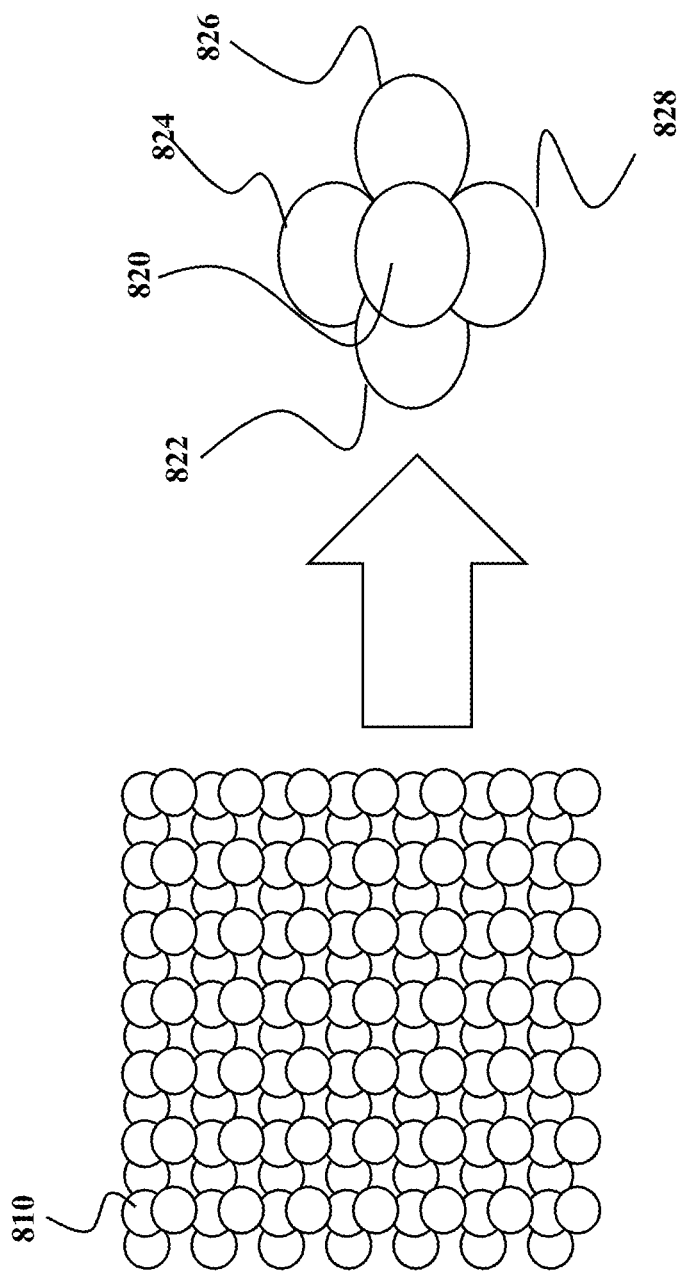
FIG. 8 shows a schematic of overlapping waves used by some embodiments.

FIG. 8 shows a schematic of overlapping waves used by some embodiments. In this example, because the energy of neighboring waves 810 are overlapping, the neural network is trained to classify the segments of the modified wave associated with the location of the pixel by processing the classified modified wave in combination of a neighboring modified wave associated with a pixel neighboring the pixel of the classified modified wave. For example, the neural network is trained to classify the segments of the modified wave associated with the location of the pixel 820 by processing a cluster of modified waves corresponding to a cluster of pixels 822, 824, 826, and 828 centered on the location of the pixel 820 of the classified modified wave. In such a manner, the accuracy and flexibility of classification based image reconstruction can be increased.

Figure 9:
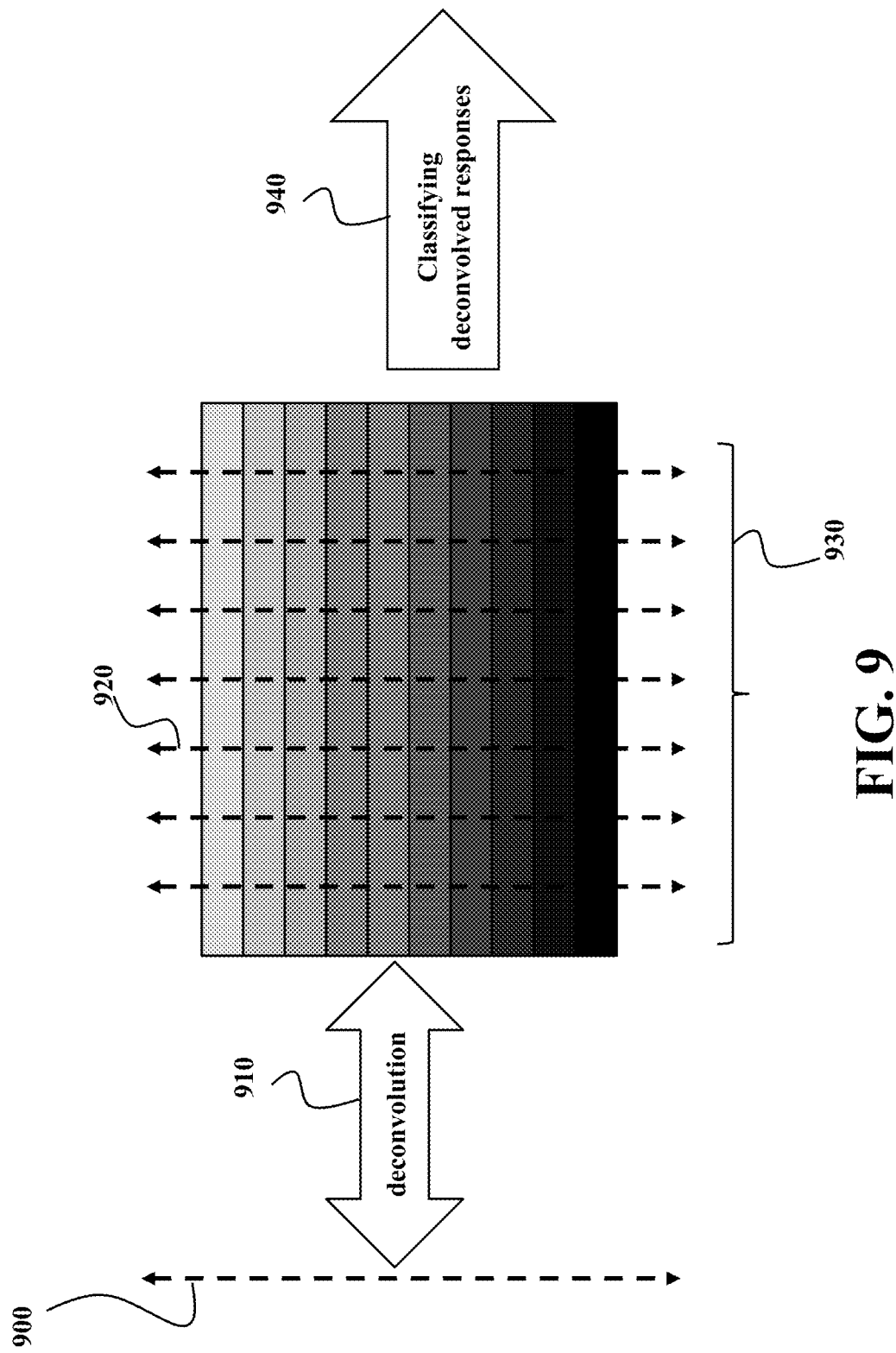
FIG. 9 shows a schematic of image reconstruction using deconvolved responses according to one embodiment.

FIG. 9 shows a schematic of image reconstruction using deconvolved responses according to one embodiment. In this embodiment, the emitter is configured to emit a reference wave 900 to propagate over the same distance as the modified waves 940 without penetrating the layers of the target object. The embodiment is configured to deconvolve 910 each of the modified wave 930, e.g., a wave 920, with the reference wave 900 to produce a set of deconvolved responses. The neural network is trained for the deconvolved responses of the modified wave to classify 940 each segment of the deconvolved response into one or multiple classes, such that the embodiment determines the image of the layer by classifying the set of deconvolved responses with the neural network. The deconvolution simplifies training of the neural network without decreasing the quality of image reconstruction.

Figure 10:
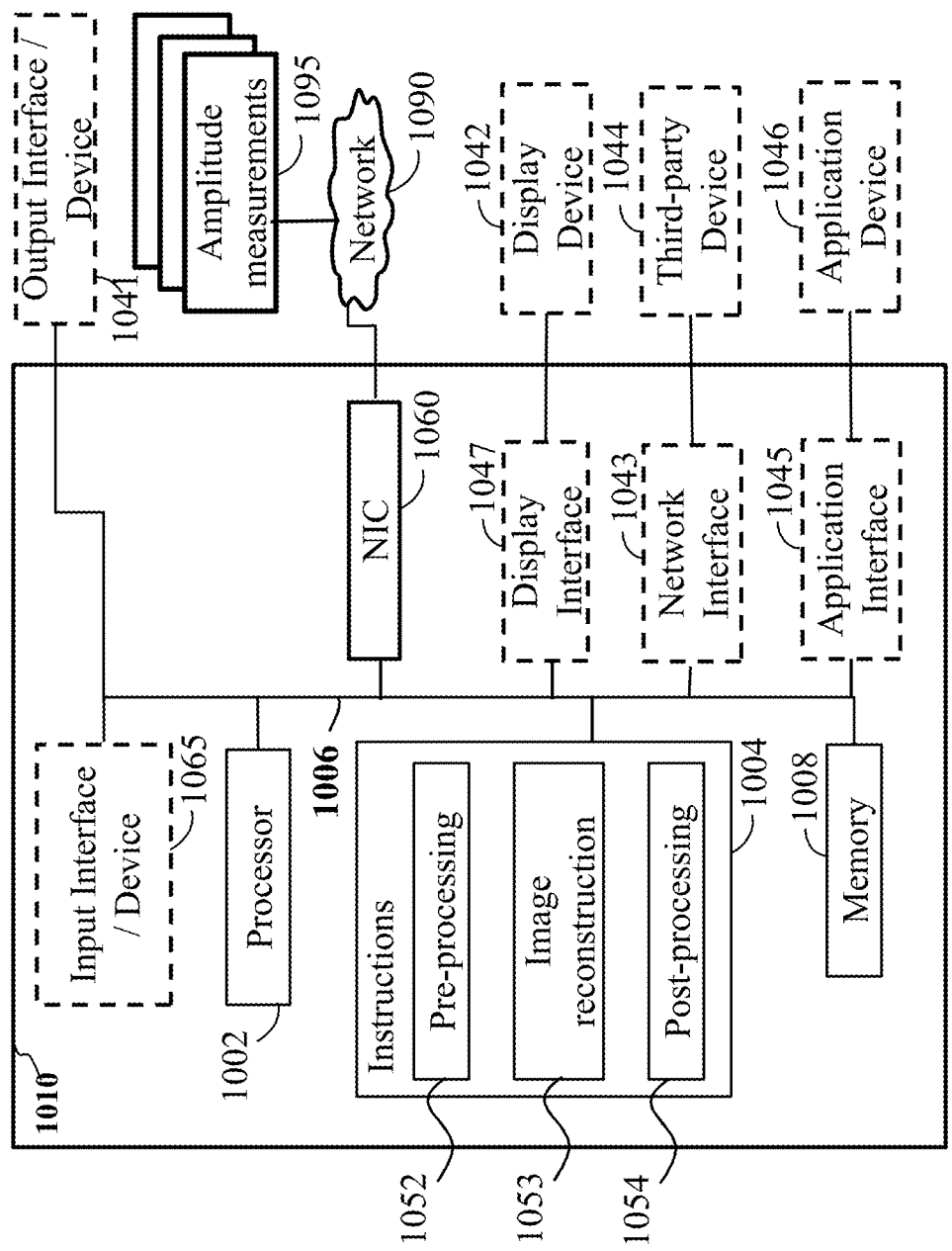
FIG. 10 shows a block diagram of a computer-based information system in accordance with some embodiments.

FIG. 10 shows a block diagram of a computer-based information system 1010 in accordance with some embodiments. The information system 1010 can include a processor 1002 configured to execute stored instructions, as well as a memory 1008 that can store instructions executable by the processor. The processor 1002 can be a single core processor, a multi-core processor, a computing cluster, or any number of other configurations. The memory 1008 can include random access memory (RAM), read only memory (ROM), flash memory, or any other suitable non-transitory computer readable storage medium. The processor 1002 is connected through a bus 1006 to one or more input interface/device 1065 and output interface/device 141.

These instructions 1004 stored in the memory 1008 can implement image recovery of a structure of the target object. For example, the instructions can include a pre-processing 1052, such as filtering, partitioning, time-gating, peak finding, and denoising on the measurements 1095 of the reflected wave. The instructions further provide the implementations of the image reconstruction 1053 according to different embodiments. Optionally, the instructions can include post-processing to further improve the quality of the reconstructed images and/or to combine the reconstructed images of the layers of the target object to produce an image of the structure of the target object.

The information system 1010 can include an output interface/device 1041 to render the estimated information. In some embodiments, the output interface 1041 may include a printer interface (not shown) adapted to connect the encoder to a printing device (not shown). In some embodiments, a display interface 1047 can be adapted to connect the processor 1002 to a display device 1042. The display device 1042 can include a camera, computer, scanner, mobile device, webcam, or any combination thereof. In some embodiments, a network interface 1043 is adapted to connect the processor 102 and also potentially to one or several third party devices 1044 on the network 1090. In some embodiments, an application interface 1045 can be used to submit the estimated information to an application device 1046, such as a controller, by non-limiting example, controlling the motion of the mobile object.

The information system 1010 can also include an input interface 1065 to receive the amplitude measurements 1095 of the amplitude of the modified waves. For example, a network interface controller (NIC) 1060 can be adapted to connect the information system 1010 through the bus 1006 to the network 1090. The network 1090 can be implemented as the wired or wireless network. Through the network 1090 and/or other implementations of the input interface 1065, the measurements 1095 of the amplitude of the reflected signal can be downloaded and stored for storage and/or further processing.

Figure 11A:
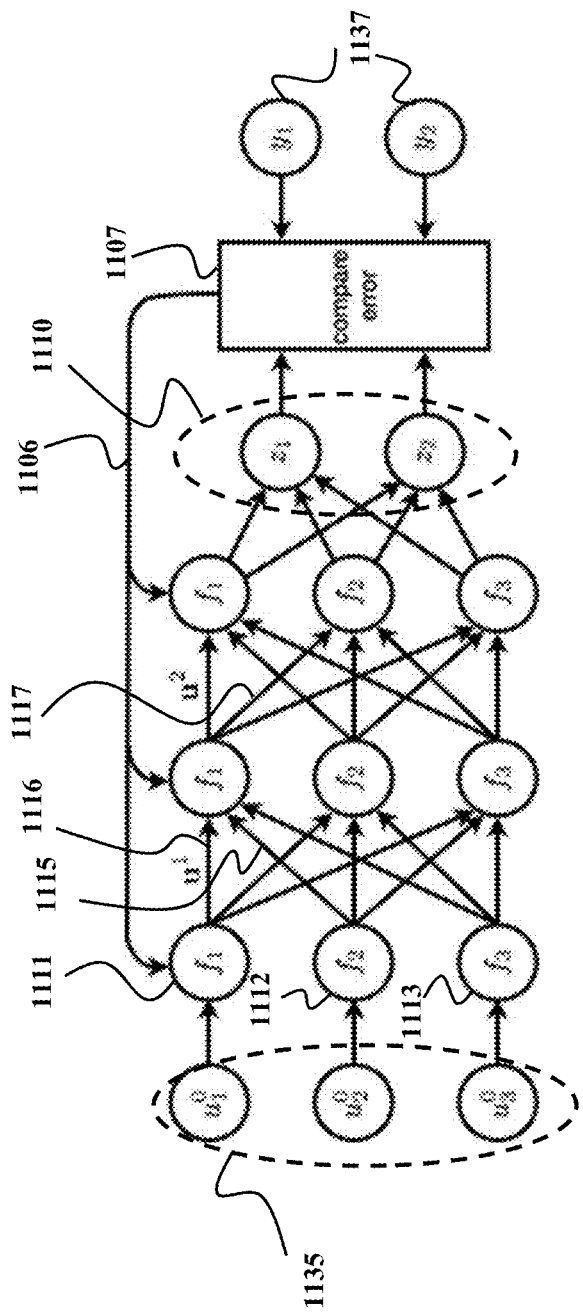
FIG. 11A shows a schematic of training a classifying neural network according to some embodiments.

FIG. 11A shows a schematic of training a classifying neural network according to some embodiments. The neural networks are a family of models inspired by biological neural networks and are used to estimate or approximate functions that can depend on a large number of inputs and are generally unknown. The neural networks are generally presented as systems of interconnected nodes or "neurons" that exchange messages between each other. Each node, such as nodes 1111, 1112, 1113, is associated with a function for transforming the wave 1135 modified by penetration through the layers of the target object. This function is usually non-linear to form a non-linear part of message transformation. Each connection between the nodes is associated with a numeric weight, such as weights 1115, 1116, 1117, for scaling of the messages to form a linear part of message transformation. Typically, the functions are fixed and predetermined for all nodes, e.g., selected by a designer of the neural network. Examples of the functions typically selected for the nodes include the sigmoid and rectifier function. In contrast, the numeric weights are different and tuned based on experience, making the neural network adaptive to inputs and capable of learning.

In addition to the hidden layers, the classification neural network can have input layers 1135 for accepting the modified wave and the output layer 1110 for outputting results of classification. The results of classifications are compared 1107 with ground truth information 1137 about structure of material corresponding to the propagation of the wave and the error is propagated 1106 back to update the weights and/or the function of the nodes of the classifying neural network. The ground truth information can be obtained from simulation and/or various alternative analysis of structure of the material.

Figure 11B:
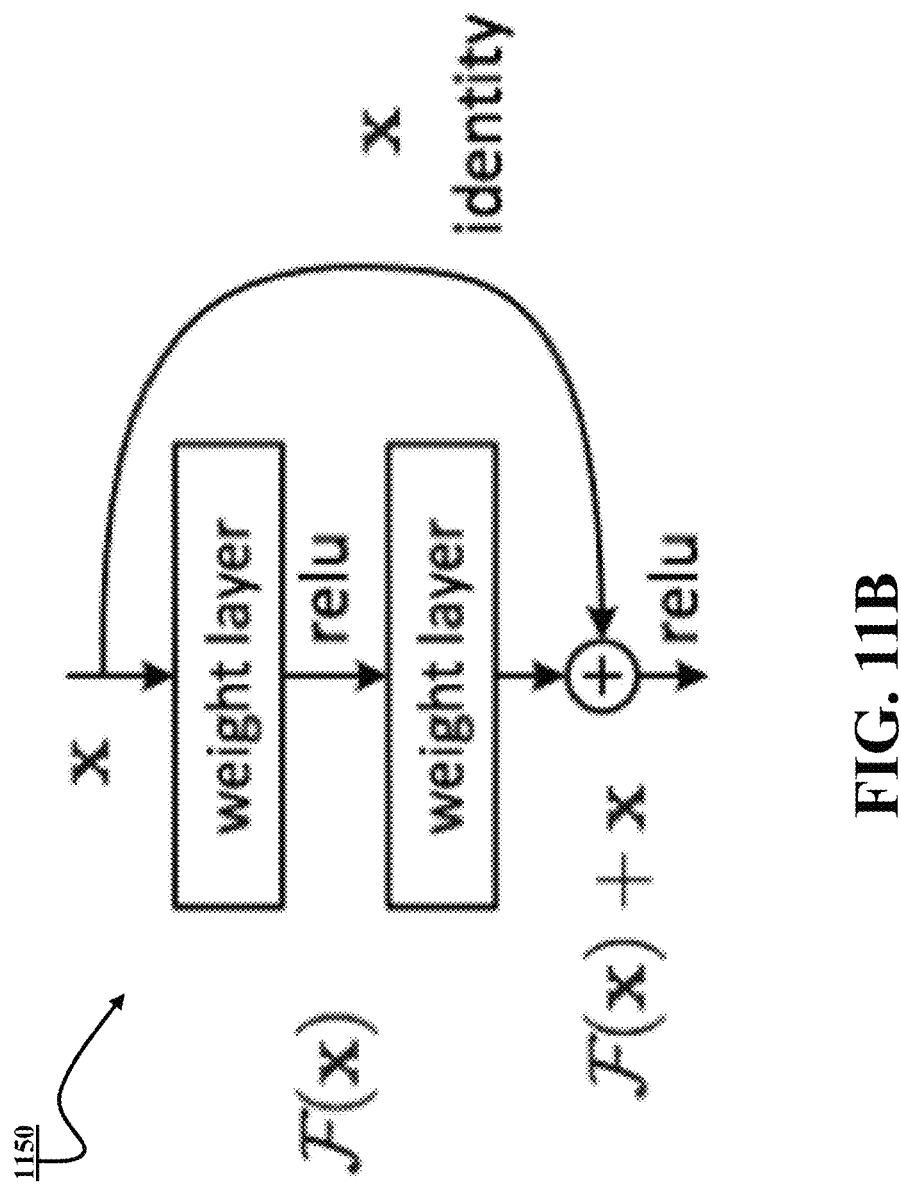
FIG. 11B shows a schematic of a deep residual network (ResNet) used by some embodiments.

FIG. 11B shows a schematic of a deep residual network (ResNet) 1150 used by some embodiments. The ResNet 1150 uses so-called residual block to skip one or more layers in the deep learning architecture for robust performance even with very deep network models, to learn the classification vector.

Figure 11C:
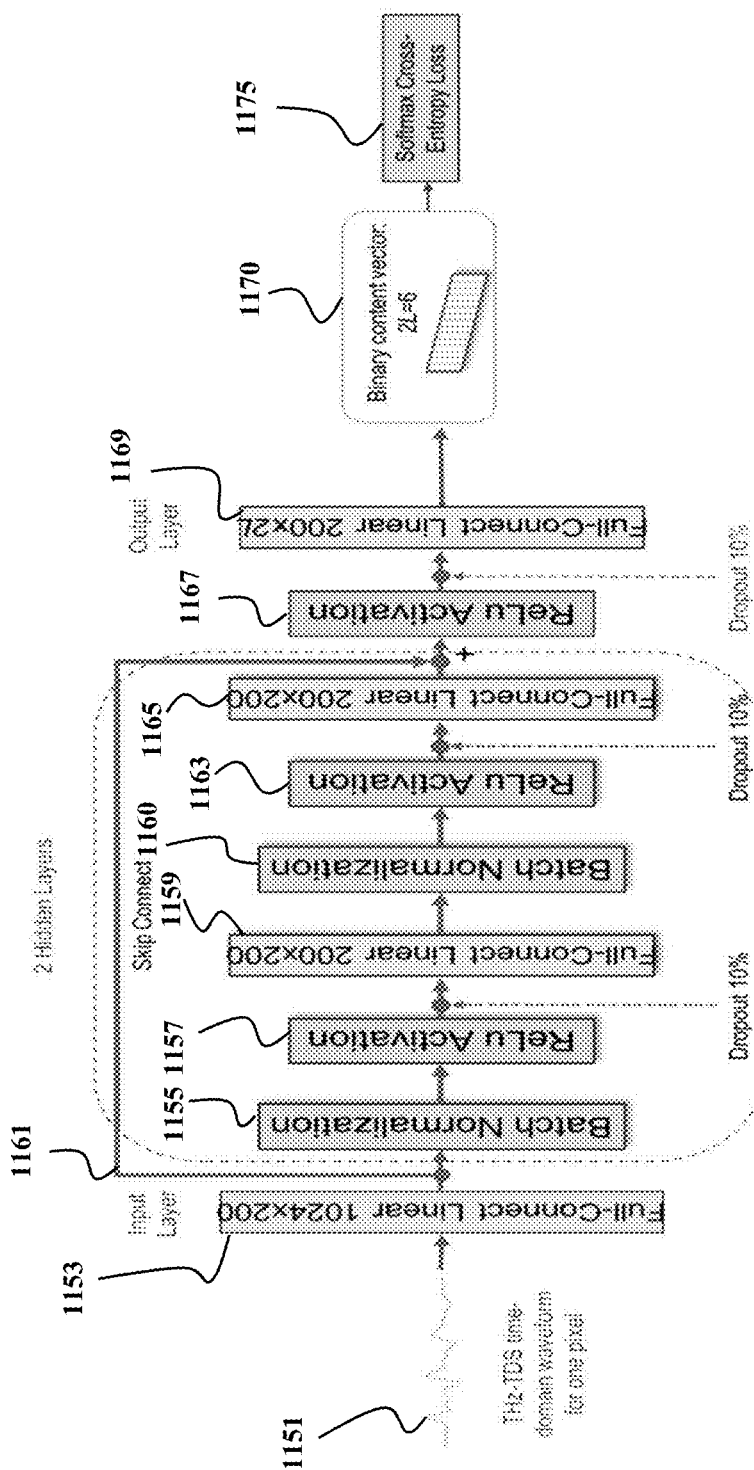
FIG. 11C shows a schematic of an exemplar DNN architecture of a classifying neural network used by one embodiment.

FIG. 11C shows a schematic of an exemplar DNN architecture of a classifying neural network used by one embodiment. The DNN feeds (truncated) THz-TDS time-domain waveforms 1151 and outputs estimated binary content vector. This embodiment can also expand the input waveform by including time-domain waveforms 1151 from nearby pixels according to the THz-TDS aperture size. Particularly, the embodiment truncates the full-length time-domain waveform into a 1024×1 real vector and this waveform vector is fed into the input layer of the DNN 1153, where the input layer 1153 first transforms to 200-node dimensions by a fully-connected linear layer. The DNN then employs two hidden layers having 200 nodes per layer, consisting of batch normalization layer 1155, rectified linear unit (ReLU) activation layer 1157 with 10% dropout, and fully-connected linear layer 1159. The dropout is a technique to prevent over-fitting for improved generalizability. Additionally, some implementations consider a skip connect 1161 jumping from the input of hidden layers to the output of hidden layers in order to learn residual gradient for improved training stability, i.e., ResNet. A fully-connected linear layer 1169 following an activation layer 1167 with dropout produces the output of the DNN. The DNN is trained to minimize the softmax cross-entropy loss 1175 to predict the content vector from labeled training pixels.

It should be noted, that in a number of situations, the structure of the target object is indeed layered. For example, a target object can be a man-made object with a layered structure, such as a stack of papers, where each sheet of paper is a layer in that multi-layer structure, a semiconductor device formed by layers of different materials, and infrastructure extended underground at different depths. For example, a target object can be a natural object with a layered structure, such as human tissue having multiple layers. In those situations, the layers of the multi-layered structure can be identified by pick finding method searching for picks of the inequities of the wave reflected by the layers of the target object.

In other situations, however, the target objects do not have a clearly observed layered structure, and the segmentation can be performed using different techniques, such as time gating with uniform and/or non-uniform gate periods. In any case, in some embodiments, the target object is considered as a multi-layered structure with layered defined by the segmentation of the reflected wave.

For example, let $x_l = [x_l(1), x_l(2), \ldots, x_l(N)]^T$ denote a reflectance vector by stacking the columns of the two-dimensional reflectance matrix at the l-th layer of the sample, where N is the number of total pixels at each layer of the sample. For example, let an emmiter, such as the THz source, illuminate the target object from a spatially encoded mask. Then, the received measurements can be described as $$y_l = A_l x_l + v_l, \qquad (1)$$

where $A_l = [a_{l,1}, \ldots, a_{l,M}]^T$ is the measurement matrix corresponding to the l-th layer, $v_l = [v_l(1), \ldots, v_l(M)]^T$ is the Gaussian distributed noise with zero mean and an unknown variance $\sigma_l^2$, i.e., $v_l : N(0, \sigma_l^2 I_M)$, $y_l = [y_l(1), \ldots, y_l(M)]^T$, and M is the number of measurements.

In practice, the THz-band SLM likely remains the same during the electro-optic sampling process which leads to the same measurement matrix A over all layers. Some embodiments, however, assume the measurement matrix $A_l$ is a function of the layer index as the measurement matrix can absorb layer-dependent inter-reflections and surface irregularity.

It is noticed that the signal model of (1) can, in fact, describe both raster and compressed scanning acquisitions. For example, in the case of the raster scanning, i.e., each pixel is illuminated and measured individually, M=N and A reduces to a diagonal matrix with diagonal elements responsible for the depth variation. In the case of the compressed scanning, e.g., the single-pixel THz camera, M<N and each row of the measurement matrix A corresponds to one random mask pattern used to form one measurement $y_m$. In the case of layered structures, the shadow effect is present due to the non-uniform penetrating illumination from front layers to deeper layers.

Different embodiments use different types of emitters selected based on an expected structure of the target object and desired type of image reconstruction. Examples of emitters include optical, ultrasound, and x-ray emitters. Some embodiments use terahertz (THz) emitters emitting within a terahertz frequency range, e.g., from 0.3 to 3 terahertz with corresponding wavelengths from 1 mm to 0.1 mm (or 100 μm). Because THz scanners are sensitive to non-uniform penetrating illumination from front layers to deep layers, the joint-layer hierarchical image recovery benefits these kinds of emitters.

Figure 12A:
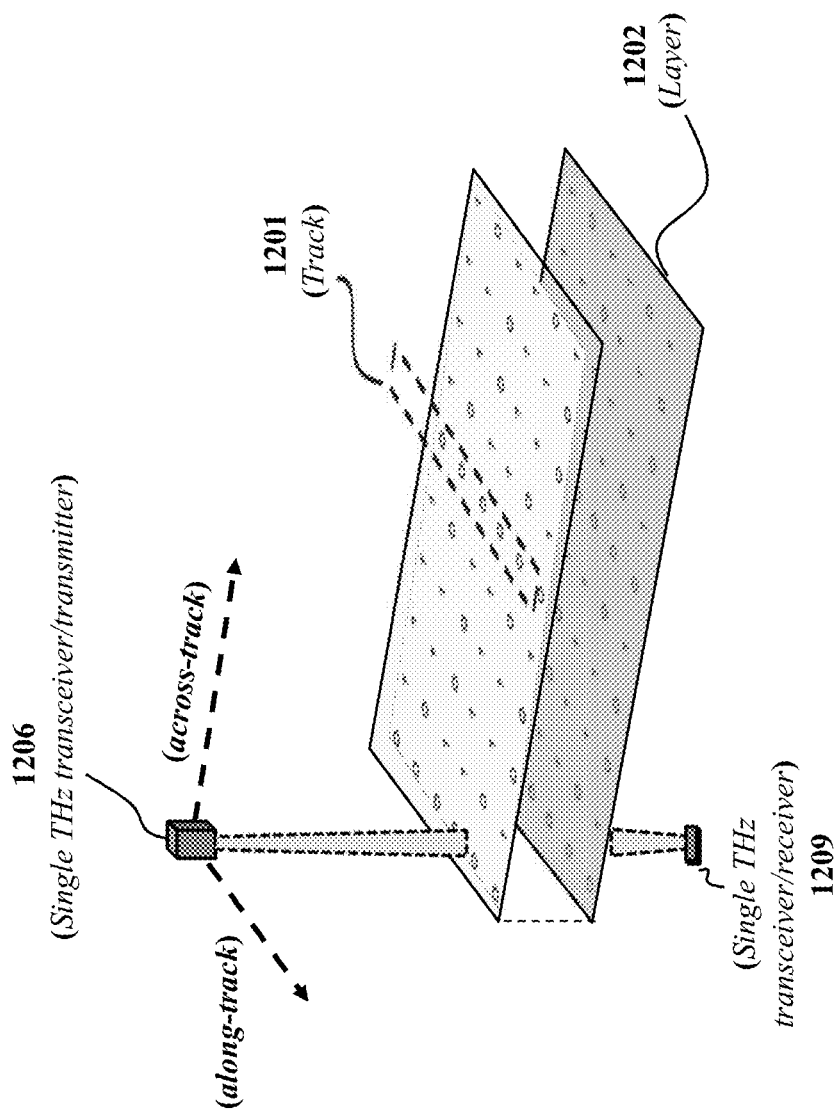
FIGS. 12A, 12B, 12C, and 12D show a schematic of THz scanners according to different embodiments.

FIG. 12A shows a schematic of using a single THz transceiver 1206 to mechanically scan the multi-layer 1202, multi-track 1201, multi-level scale, i.e., across the track and along the track, to receive the reflected waveforms to identify the coded pattern for the position. Alternatively, the single THz transceiver can be a transmitter, wherein the transmitted THz waveform passes through the multi-layered scale, and is received by a receiver 1209. In particular, the transmitted THz waveform passes through the multi-layered/multi-level scale, and the THz waveform continues directly to the receiver 1209 to identify the coded pattern for the position.

Figure 12B:
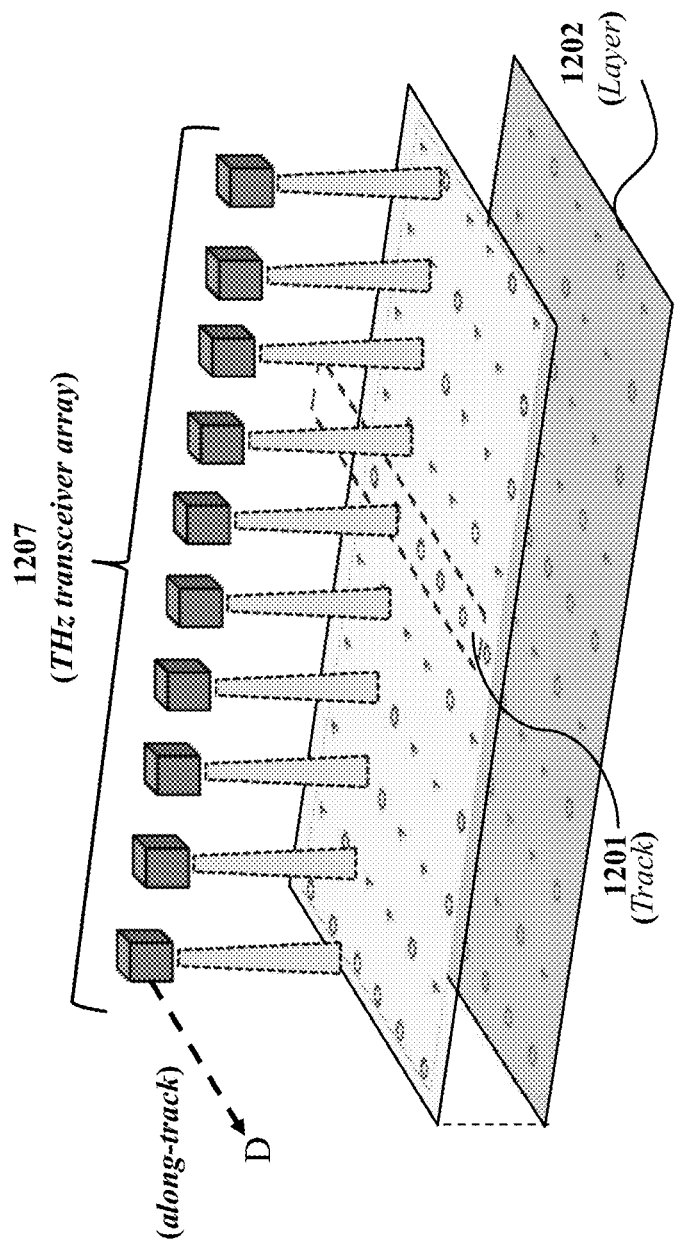

FIG. 12B shows a schematic of using multiple THz transceivers 1207 (or a THz transceiver array), wherein each THz transceiver in the array can be aligned with a single track 1201. Each THz transceiver can also be able to receive the reflected waveforms to identify the coded pattern of corresponding track for the position. The THz transceiver array 1207 can move simultaneously along the track direction D for absolute positioning.

Figure 12C:
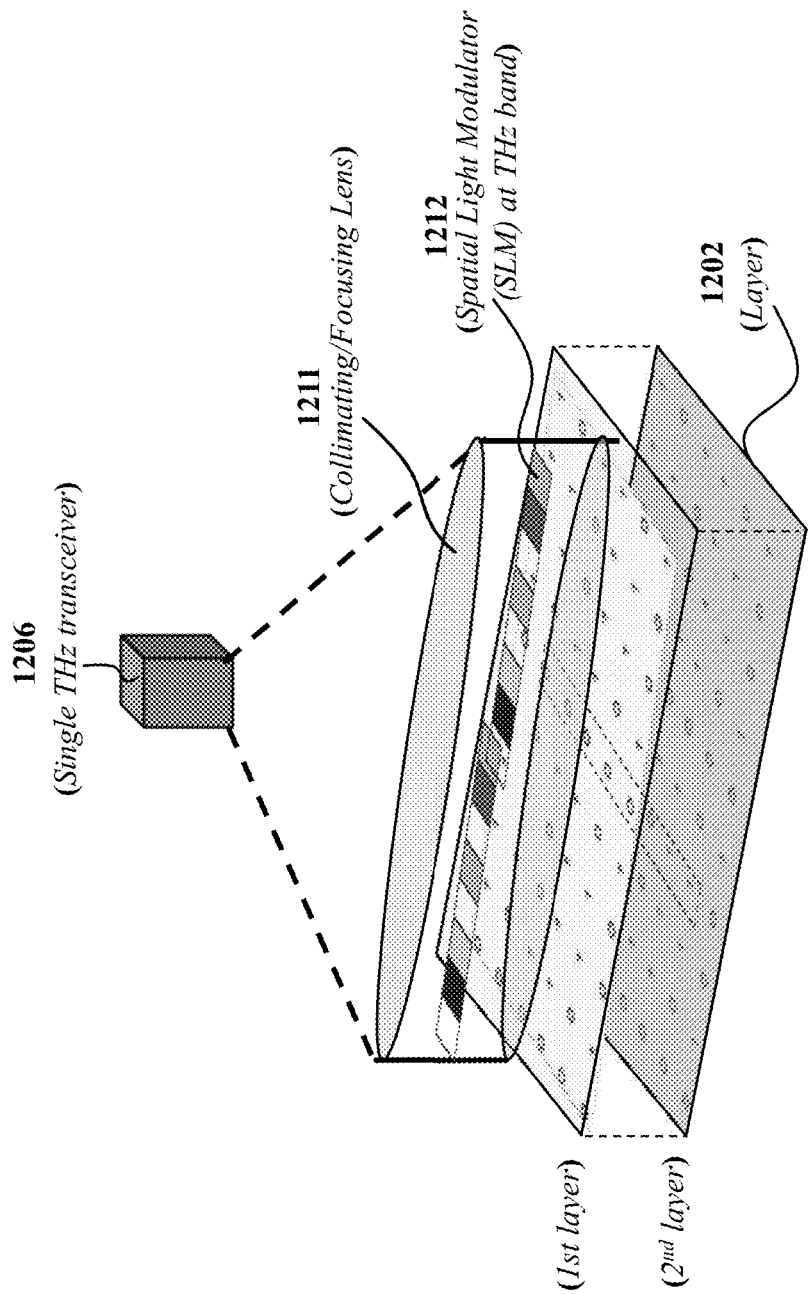

FIG. 12C shows a schematic of using a single THz transceiver 1206 together with collimating/focusing lenses 1211, spatial light modulators 1212 at the THz band. The single transceiver 1206 sends the THz waveform to the collimating lens 1211. The waveform is collimated by the collimating lens 1211 and then modulated by the spatial light modulator 1212 with random patterns. The reflected THz waveform passes through the focusing lens 1211 and detected by the single THz transceiver 1206.

Figure 12D:
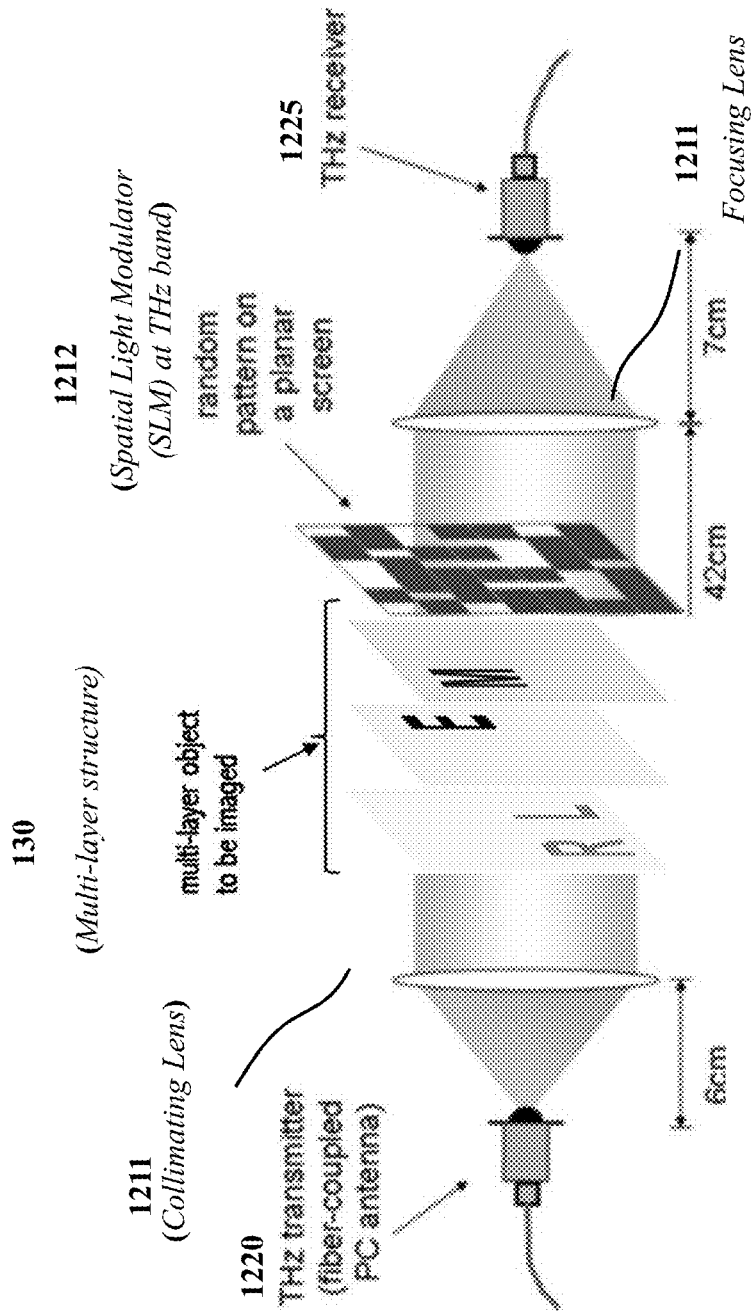

FIG. 12D shows a schematic of using a THz transmitter 1220 and a THz receiver 1225 separated on both sides of a multi-layer non-overlapping sample 130, along with collimating/focusing lenses 1211, spatial light modulators 1212 at the THz band. This acquisition is similar to FIG. 12C but in a transmission mode.

FIG. 13 shows a schematic of a multi-layer structure with different patterns of the layers, according to one embodiment. The layered structure includes multiple tracks 1301 of coded patterns and multiple layers 1302 of coded patterns. In each track, the number 1303 specifies a level of reflectance of the coded pattern in the THz band. For example, 0 means a complete absorption of THz emitted signal, while 1 means a strong reflection of THz emitted signal. The number 1303 can be binary or multi-level with a pre-defined mapping between the reflectance and the number. THz scanning over multi-layer non-overlapping patterns of this embodiment can be used for positioning in elevator/train systems.

Some embodiments employ a scanner according to various embodiments as part of automation system. Automation is the technology by which a process or procedure is performed with minimal human assistance. Automation or automatic control is the use of various control systems for operating equipment such as machinery, processes in factories, boilers and heat treating ovens, switching on telephone networks, steering and stabilization of ships, aircraft and other applications and vehicles with minimal or reduced human intervention.

Figure 14:
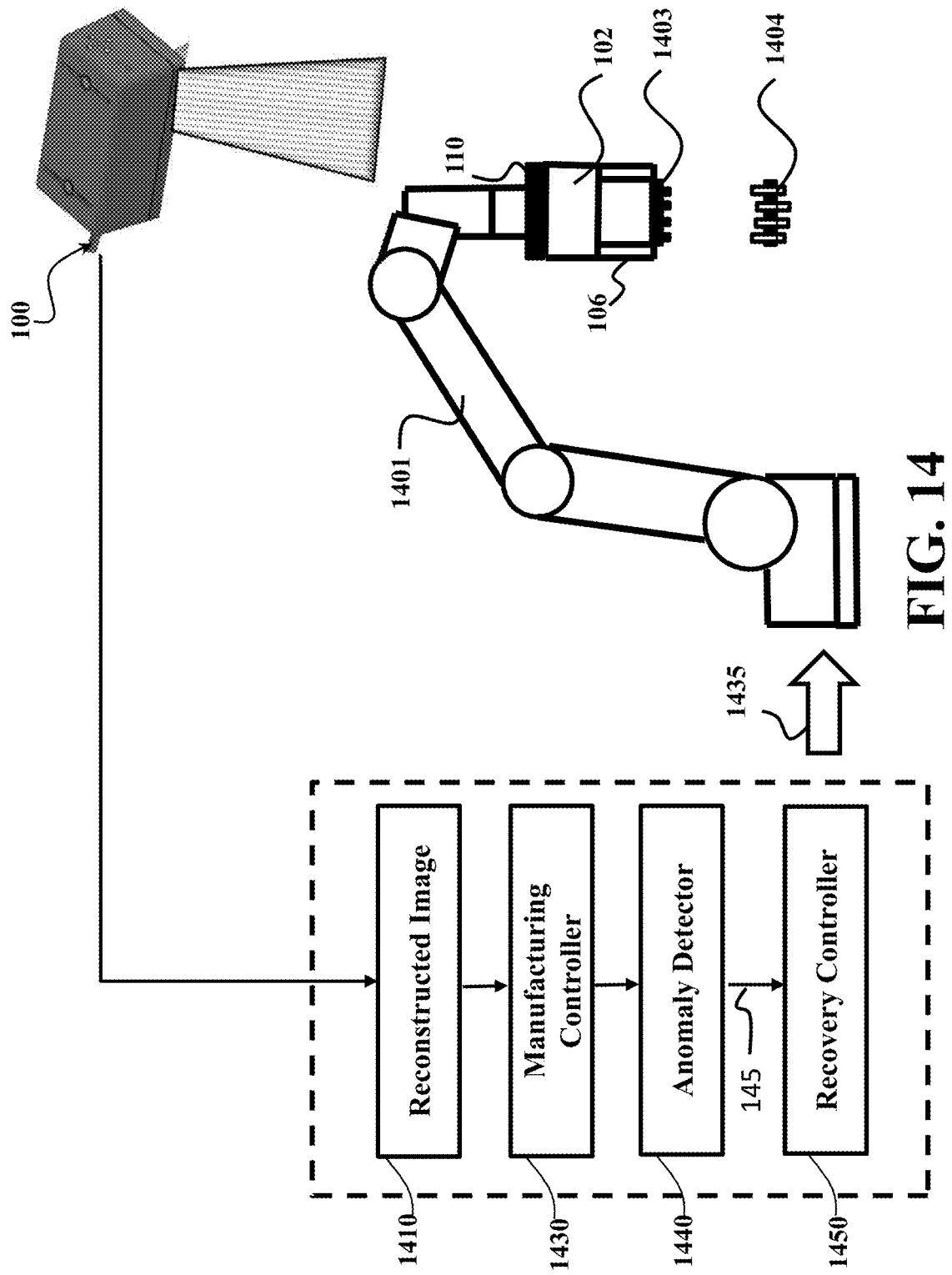
FIG. 14 shows a schematic of an automation system including the scanner according to some embodiments.

FIG. 14 shows a schematic of an automation system including the scanner according to some embodiments. In these embodiments, the classification based image reconstruction is used for anomaly detecting to control a process of manufacturing a target object. The automation system includes one or combination of a manufacturing controller 1430 configured to control 1435 an equipment 1401 manufacturing the target object, and an anomaly detector 1440 configured to inspect the image of the layer 1410 of target object after and/or during the manufacturing process, and a recovery controller 1450 configured to cause a modification of the control of the equipment based on a negative result of the inspection.

For example, the anomaly detector can compare the reconstructed image 1410 with a test image, and if a comparison error is greater than a threshold, the recovery controller stops the controlling 1435. Additionally, or alternatively, the recovery controller can alter the control 1435 without stopping the manufacturing process. For example, in one embodiment, the equipment 1401 paint a surface of a body of a vehicle. The reconstructed image includes density information for each layer of the paint, and recovery controller can request the manufacturing controller to add another layer of the paint of the density is not adequate.

The equipment 1401 illustrated on FIG. 14 is a robotic assembly performing an operation including an insertion of a component along an insertion line to assemble a target object. The robotic assembly includes a robotic arm that inserts a first component 1403 into a second component 1404. In some embodiments, the robotic arm includes a wrist 1402 for ensuring multiple degrees of freedom of moving the component 1403. In some implementations, the wrist 1402 has a gripper 1406 for holding the mobile component 1403. Examples of target object include a semiconductor, a transistor, a photonic integrated circuit (PIC), etc.

Figure 15:
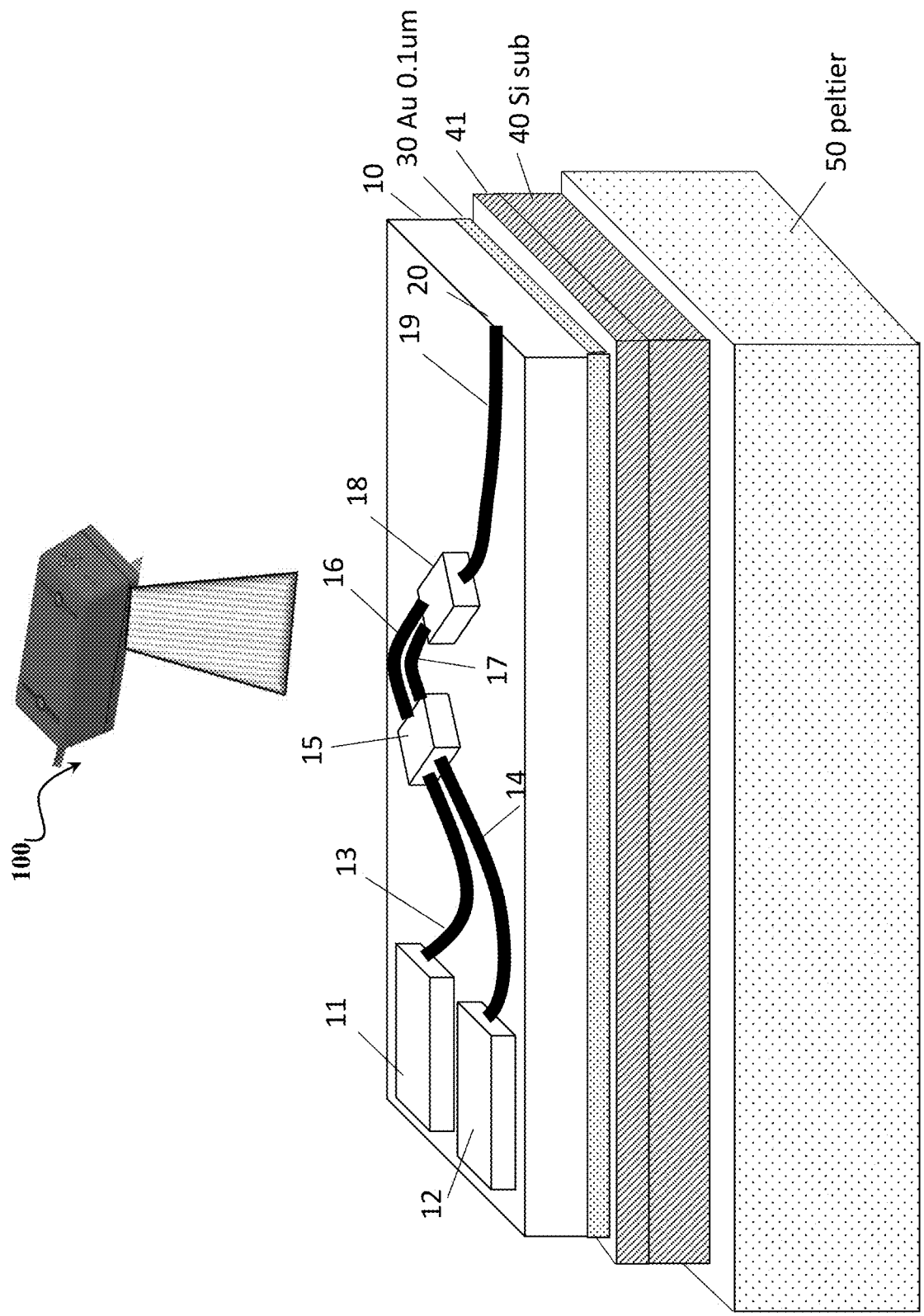
FIG. 15 shows a schematic of layered structure of a photonic integrated circuit (PIC) manufactured by automation system according to some embodiments.

FIG. 15 shows a schematic of layered structure of a photonic integrated circuit (PIC) manufactured by automation system according to some embodiments. The photonic integrated circuit includes optical components integrated on a substrate 10 with a contact layer 30. The photonic integrated circuit 100 is attached to a submount 40 via the bottom of the substrate 10 and a contact layer 30. The submount 40 is attached to a temperature-controlling thermo-electric cooler 50, e.g., a peltier device. The temperature-controlling thermo-electric cooler 50 may be referred to as a cooling device 50. The substrate 10 may be a semiconductor substrate such as an indium phosphide (InP), gallium arsenide (GaAs), gallium nitride (GaN), and silicon (Si). Further, the submount 40 may be formed by silicon, aluminum nitride (AlN) or Alumina. The layered structure and dimensions of the PIC allows to take advantage from THz-TDS imaging of some embodiments during manufacturing process.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A scanner for image reconstruction of a structure of a target object, comprising:
   an emitter configured to emit a set of waves in parallel directions of propagation to penetrate a sequence of layers of the target object forming the structure of the target object;

a receiver configured to measure intensities of the set of waves modified by penetration through the layers of the target object;

a memory configured to store a neural network trained to classify each segment of a sequence of segments of a modified wave into one or multiple classes, wherein the sequence of segments corresponds to the sequence of layers of the target object, such that a segment of modified wave corresponds to a layer having the same index in the sequence of layers as an index of the segment in the sequence of segments;

a hardware processor configured to (1) execute the neural network for each modified wave to produce the classes of segments of the modified waves, and (2) select the classes of segments of different modified waves corresponding to the same layer to produce an image of the layer of the target object with pixel values being functions of labels of the selected classes; and an output interface to render one or multiple of the images of one or multiple layers of the target object.

2. The scanner of claim 1, wherein each modified wave is associated with a location of a pixel in the image of each layer, such that a segment of a layer is associated with the location of the pixel associated with its modified wave, and wherein a value of the pixel at the location in the image of the layer is a function of the label of the class of the segment associated with the location of the pixel in the image of the layer.

3. The scanner of claim 2, wherein each modified wave is uniquely associated with the location of the pixel in the image of each layer, and wherein the value of the pixel is the label of the class of the segment associated with the location of the pixel.

4. The scanner of claim 2, wherein multiple modified waves are associated with the location of the pixel in the image of each layer, and wherein the value of the pixel is a combination of labels of the classes of the segments associated with the location of the pixel.

5. The scanner of claim 2, wherein the neural network is trained to classify the segments of the modified wave associated with the location of the pixel by processing the classified modified wave in combination of a neighboring modified wave associated with a pixel neighboring the pixel of the classified modified wave.

6. The scanner of claim 2, wherein the neural network is trained to classify the segments of the modified wave associated with the location of the pixel by processing a cluster of modified waves corresponding to a cluster of pixels centered on the location of the pixel of the classified modified wave.

7. The scanner of claim 1, wherein the emitter is configured to emit a reference wave to propagate over the same distance as the modified waves without penetrating the layers of the target object, wherein the processor is configured to deconvolve each modified wave with the reference wave to produce a set of deconvolved responses, and wherein the neural network is trained for the deconvolved responses of the modified wave to classify each segment of the deconvolved response into one or multiple classes, such that the processor determines the image of the layer by classifying the set of deconvolved responses with the neural network.

8. An automation system including the scanner of claim 1, the automation system comprising:

a manufacturing controller configured to control an equipment manufacturing the target object;

an anomaly detector configured to inspect the image of the layer; and a recovery controller configured to cause a modification of the control of the equipment based on a result of the inspection.

9. The automation system of claim 8, wherein the target object is one or combination of a semiconductor, a photonic integrated circuit (PIC), a coating layer on a surface of a body of a vehicle.

10. The scanner of claim 1, wherein the target object includes a stack of sheet of papers, such that at least one layer of the target object is a sheet of paper with text printed on one or both of its sides, wherein the image of the layer includes text printed on one or both sides of the sheet paper.

11. The scanner of claim 1, wherein the emitter emits the wave within a terahertz frequency range.

12. The scanner of claim 11, wherein the terahertz frequency range is from 0.3 to 3 terahertz.

13. The scanner of claim 1, wherein the scanner operates in a compressed scanning mode, wherein the emitter includes a collimator to collimate the wave to a broad beam, and a spatial encoder to spatially encode the broad beam with a random mask; wherein the receiver includes a focusing lens to focus the reflected wave, and a single-pixel photoconductive detector receiving the focused wave from the focusing lens to provide one measurement of the focused wave at a time; and wherein the hardware processor recovers the image of the multi-layer structure using a sparse reconstruction.

14. The scanner of claim 1, wherein the neural network is a binary classifier to estimate black or white value at a location of a pixel of the image of the layer.

15. The scanner of claim 1, wherein the neural network is a multi-class classifier to estimate a grayscale value at a location of a pixel of the image of the layer.

16. The scanner of claim 1, wherein the neural network is a multi-class classifier to estimate a value of permittivity of material of the target object at a location of a pixel of the image of the layer.

17. The scanner of claim 1, wherein the processor is configured to combine the reconstructed images of the layers of the target object to produce an image of the structure of the target object.

18. A method for image reconstruction of a structure of a target object, wherein the method uses a processor coupled with stored instructions implementing the method, wherein the instructions, when executed by the processor carry out steps of the method, comprising:

causing propagation a set of waves in parallel directions of propagation to penetrate a sequence of layers of the target object forming the structure of the target object;

receiving intensities of the set of waves modified by penetration through the layers of the target object;

executing a neural network for each modified wave to produce the classes of segments of the modified waves, wherein the neural network is trained to classify each segment of a sequence of segments of a modified wave into one or multiple classes, wherein the sequence of segments corresponds to the sequence of layers of the target object, such that a segment of modified wave corresponds to a layer having the same index in the sequence of layers as an index of the segment in the sequence of segments;

selecting the classes of segments of different modified waves corresponding to the same layer to produce an image of the layer of the target object with pixel values being functions of labels of the selected classes; and rendering one or multiple of the images of one or multiple layers of the target object.

19. The method of claim 18, wherein the waves are within a terahertz frequency range.

20. A non-transitory computer readable storage medium embodied thereon a program executable by a processor for performing a method, the method comprising:

causing propagation a set of waves in parallel directions of propagation to penetrate a sequence of layers of the target object forming the structure of the target object;

receiving intensities of the set of waves modified by penetration through the layers of the target object;

executing a neural network for each modified wave to produce the classes of segments of the modified waves, wherein the neural network is trained to classify each segment of a sequence of segments of a modified wave into one or multiple classes, wherein the sequence of segments corresponds to the sequence of layers of the target object, such that a segment of modified wave corresponds to a layer having the same index in the sequence of layers as an index of the segment in the sequence of segments;

selecting the classes of segments of different modified waves corresponding to the same layer to produce an image of the layer of the target object with pixel values being functions of labels of the selected classes; and rendering one or multiple of the images of one or multiple layers of the target object.

* * * * *